United States Patent
Kanoh

(10) Patent No.: US 9,195,629 B2
(45) Date of Patent: Nov. 24, 2015

(54) DATA TRANSFER SYSTEM

(75) Inventor: Yasushi Kanoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 402 days.

(21) Appl. No.: 13/213,371

(22) Filed: Aug. 19, 2011

(65) Prior Publication Data

US 2012/0047349 A1 Feb. 23, 2012

(30) Foreign Application Priority Data

Aug. 23, 2010 (JP) ................................. 2010-186327

(51) Int. Cl.
  *G06F 13/14* (2006.01)
  *G06F 15/173* (2006.01)
  *H04L 12/835* (2013.01)
  *H04L 12/801* (2013.01)

(52) U.S. Cl.
  CPC .......... *G06F 15/17325* (2013.01); *G06F 13/14* (2013.01); *H04L 47/17* (2013.01); *H04L 47/30* (2013.01)

(58) Field of Classification Search
  CPC .......... G06F 13/14; H04L 47/17; H04L 47/30
  USPC ..................................................... 712/18, 11
  See application file for complete search history.

(56) References Cited

U.S. PATENT DOCUMENTS

| | | | | |
|---|---|---|---|---|
| 5,835,482 | A * | 11/1998 | Allen | 370/225 |
| 6,072,772 | A * | 6/2000 | Charny et al. | 370/229 |
| 6,359,861 | B1 * | 3/2002 | Sui et al. | 370/230 |
| 6,683,885 | B1 * | 1/2004 | Sugai et al. | 370/423 |
| 8,234,428 | B2 | 7/2012 | Osano et al. | |
| 2002/0154653 | A1 * | 10/2002 | Benveniste | 370/447 |
| 2003/0188065 | A1 * | 10/2003 | Golla et al. | 710/243 |
| 2003/0225737 | A1 * | 12/2003 | Mathews | 707/1 |
| 2005/0105515 | A1 * | 5/2005 | Reed et al. | 370/360 |

(Continued)

FOREIGN PATENT DOCUMENTS

| | | |
|---|---|---|
| JP | 2004-078713 A | 3/2004 |
| JP | 2004-086304 A | 3/2004 |

(Continued)

OTHER PUBLICATIONS

Free On-Line Dictionary of Computing, "routing" article, (May 26, 2001), 1 page.*

(Continued)

*Primary Examiner* — Andrew Caldwell
*Assistant Examiner* — Keith Nielsen
(74) *Attorney, Agent, or Firm* — Young & Thompson

(57) ABSTRACT

A data transfer system includes: a plurality of processors; and a plurality of data transfer units that executes a data transfer from one processor to another processor via a plurality of input ports and a plurality of output ports. The data transfer unit includes: an arbitration unit that executes arbitration of conflicting data sent to a same next destination; and a strength information notification unit that sends strength information indicating a number of conflicts of the arbitrated conflicting data to the next destination. The arbitration unit decides a selection ratio, which is a ratio of selecting each of the input ports and receiving the conflicting data from the selected input port, according to a ratio between the input ports in relation to a magnitude of the number of conflicts indicated by the strength information received from each of the input ports.

8 Claims, 24 Drawing Sheets

(56) References Cited

U.S. PATENT DOCUMENTS

2006/0101234 A1* 5/2006 Hannum et al. ............ 712/11
2007/0260792 A1* 11/2007 Pathak et al. ............ 710/113
2010/0325327 A1* 12/2010 Marietta et al. ........... 710/240

FOREIGN PATENT DOCUMENTS

JP         2009-194510      8/2009
WO        2010-086906 A1    8/2010

OTHER PUBLICATIONS

Leiserson, Fat-Trees: Universal Networks for Hardware-Efficient Supercomputing, IEEE Transactions on Computers, vol. C-34, No. 10, Oct. 1985, pp. 892-901.
Japanese Office Action dated Apr. 1, 2014; Patent Application No. 2010-186327.

* cited by examiner

DATA TRANSFER SYSTEM

INCORPORATION BY REFERENCE

This application is based upon and claims the benefit of priority from Japanese patent application No. 2010-186327, filed on Aug. 23, 2010, the disclosure of which is incorporated herein in its entirety by reference.

BACKGROUND

1. Field of the Invention

The present invention relates to a data transfer system, a switch, and a data transfer method, and more particularly, to a technique that executes a data transfer from one processor to another processor included in a plurality of processors.

2. Description of Related Art

A Fat Tree is disclosed in "Fat-Trees: Universal Networks for Hardware-Efficient Supercomputing, C. E. Leiserson, IEEE Transactions on Computers, Vol. C-34, No. 10, October 1985" (hereafter, referred to as a "Non Patent Literature") as an inter-processor network of a parallel computer. As an example of the Fat Tree, a sixteen-input sixteen-output Fat Tree network including a four-input four-output switch 1501 is shown in FIG. 19. Note that, FIG. 19 is drawn by the inventor of the present invention and is not a figure of related art. The same applies to FIG. 20 to FIG. 24. A signal line 1502 between the switches 1501 denotes a two-way link. Sixteen processors 1503 from a processor 0 to a processor 15 are connected in the Fat Tree. Note that, in FIG. 19, references for each of the switches, the processors and the signal lines are omitted except one of each of them.

FIG. 20 shows an example of routing in the Fat Tree. When a packet climbs upward on the Fat Tree, the switch 1501 executes routing according to an output port opposed to an input port. In the Fat Tree, the packet climbs to a common switch between a source processor and a destination processor, and then turns back and climbs down. For example, in communication from a processor 4 (1601) to a processor 15 (1602), a switch A (1603) is the common switch. Therefore, the packet climbs to the switch A (1603) and turns back. In communication from a processor 0 (1604) to a processor 3 (1605), a switch B (1606) is the common switch. Therefore, the packet climbs to the switch B (1606) and turns back. The common switch varies depending on the routing which is executed by each of the switches when the packet climbs the Fat Tree. However, how far (how many stages) the packet climbs is decided depending on the source processor and the destination processor, and does not vary depending on the routing.

Accordingly, when communicating with the destination processor, how many switches the packet goes through varies depending on the source processor. For example, when the packet is sent to the processor 15 (1602), the packet which is sent from a processor 14 (1607) arrives at the processor 15 (1602) by way of only one switch C (1608). The packet which is sent from a processor 12 (1609) and a processor 13 (1610) arrive at the processor 15 (1602) via three switches. When the packet is sent from any of the processors 0 to 11, the packet arrives at the processor 15 (1602) via five switches. Note that, the routing of the packet climbing the Fat Tree always uses the output port opposed to the input port. Therefore, when the packet climbs the Fat Tree, a conflict of the packets does not occur in the switch. When the packet climbs down the Fat Tree, the conflict of the packets occurs.

FIG. 21 shows an example of a configuration of the switch. The switch includes each of FIFO (First In First Out) memories 1710 to 1717 for each of input ports 1702 to 1705 and output ports 1706 to 1709. The FIFO memories 1710 to 1717 are connected to each other through a crossbar switch 1718. When the packets from the plurality of input ports are sent to the same output port, the packets conflict. When the packets conflict, the packet which is input from one of the input ports is selected in the crossbar switch 1718 by an arbitration circuit 1719. The selected packet goes through the crossbar switch 1718, and is written in one of the FIFO memories 1714 to 1717 of the output ports 1706 to 1709. The packet which is not selected waits in the FIFO memories 1710 to 1713 of the input ports until it is selected. Generally, an arbitration algorithm of the arbitration circuit 1719 is created to equally select each of the conflicting packets. That is, it is created to prevent a packet from continuously losing in the conflict arbitration and causing starvation state thereby. Note that, when N number of packets conflict, it is possible to consider a probability of selecting each of the packets in the conflict arbitration as one in N (N is a positive integer of two or more).

Going through one of the switches when the packet climbs down the Fat Tree means that there is a possibility to keep the packet waiting by the conflict arbitration. Since the switch is the four-input four-output switch, there is a possibility that the conflict between the packets which are input from the three input ports occurs when the packet is sent to an output port. Therefore, the possibility that the packet waits by the conflict arbitration is increased with an increase in the number of the switches through which the packet goes when the packet climbs down the Fat Tree.

For example, in a communication from a processor 0 (1801) to a processor 15 (1802) shown in FIG. 22, the conflict occurs in each of a switch D (1803), a switch E (1804), and a switch F (1805). The three packets conflict in each of the switches. Therefore, the probability of selecting each of the packets in the conflict arbitration in each of the switches is one third. Accordingly, the packet which is sent from the processor 0 (1801) to the processor 15 (1802) arrives with a probability of one twenty-seventh without waiting, when the conflict among the three packets including the packet occurs in all of the three switches through which the packet goes.

In a communication from a processor 12 (1901) to a processor 15 (1902) shown in FIG. 23, the conflict occurs in each of a switch E (1903) and a switch F (1904). The three packets conflict in each of the switches. Therefore, the probability of selecting each of the packets in the conflict arbitration in each of the switches is one third. Accordingly, the packet which is sent from the processor 12 (1901) to the processor 15 (1902) arrives with a probability of one ninth without waiting, when the conflict between the three packets including the packet occurs in both of the two switches through which the packet goes.

In a communication from a processor 14 (2001) to a processor 15 (2002) shown in FIG. 24, the conflict occurs in a switch F (2003). The three packets conflict in the switch. Therefore, the probability of selecting each of the packets in the conflict arbitration in the switch is one third. Accordingly, the packet which is sent from the processor 14 (2001) to the processor 15 (2002) arrives with a probability of one third without waiting, when the conflict among the three packets including the packet occurs in the one switch through which the packet goes.

In this manner, in the routing in the Fat Tree, if the location of the source processor varies when sending the packet to a processor, the number of the switches through which the packet goes until the packet arrives varies. In other words, the number of the conflict arbitrations which are executed for the packet until the packet arrives varies, thus the probability that the packet arrives without waiting varies. That is, there is a problem that the packets transferred between processors could vary in their transfer time depending on the location of the processor which sends the packet.

In this manner, if the time until the packet arrives at the destination varies, processing with the use of the packet which takes a long time to arrive at destination becomes a bottleneck. Therefore, there is a problem that a processing delay occurs as a whole computer system.

Note that Japanese Unexamined Patent Application Publication No. 2009-194510 discloses a priority arbitration system which prevents latency of the packet waited by the conflict on the route or the packet via a long route from being decreased. This priority arbitration system is equipped with a plurality of CPUs, a plurality of shared resources, a routing table, and a plurality of crossbars. When sending a request packet to the shared resource, the CPU takes out a latency value corresponding to the destination shared resource from the routing table corresponding to itself, and sets the latency value to the packet header of the request packet. When receiving a plurality of the packets, the crossbar compares the latency values of the received packets, and then preferentially allows the packet having the large latency value to go through the switch.

However, Japanese Unexamined Patent Application Publication No. 2009-194510 does not disclose a technique which decides a selection ratio of receiving conflicting data from each of input ports based on strength information corresponding each of the input ports, when the arbitration is executed.

As described in the related arts, the technique disclosed in the Non Patent Literature has a problem that the packets transferred between processors could vary in their transfer time.

SUMMARY

An exemplary object of the invention is to provide a data transfer system, a switch, and a data transfer method that can reduce a variance of the transfer time of the packets transferred between processors to solve the above problem.

In a first exemplary aspect of the invention, a data transfer system includes: a plurality of processors; and a plurality of data transfer units that executes a data transfer from one processor to another processor included in the plurality of processors via a plurality of input ports and a plurality of output ports, in which the data transfer unit includes: an arbitration unit that executes arbitration of two or more pieces of conflicting data which are sent to a same next destination; and a strength information notification unit that sends strength information indicating a number of conflicts of the two or more pieces of arbitrated conflicting data to the next destination, and in which the arbitration unit decides, when receiving the conflicting data from a plurality of the data transfer units via a plurality of the input ports and executing the arbitration, a selection ratio which indicates a ratio of selecting each of the plurality of input ports and receiving the conflicting data from the selected input port, according to a ratio between the input ports in relation to magnitude of the number of conflicts indicated by the strength information received from each of the input ports.

In a second exemplary aspect of the invention, a data transfer system includes: a plurality of processors; and a plurality of data transfer units that executes a data transfer from one processor to another processor included in the plurality of processors via a plurality of input ports and a plurality of output ports, in which the processor sends strength information indicating an initial value to a next destination, and the data transfer unit includes: an arbitration unit that executes arbitration of two or more pieces of conflicting data which are sent to a same next destination; and a strength information notification unit that, when receiving two or more pieces of the strength information from a plurality of the data transfer units via a plurality of the input ports, generates the strength information indicating a total value of a value indicated by each of the two or more pieces of received strength information and sends the generated same strength information to each of a plurality of next destinations via a plurality of the output ports, and in which the arbitration unit decides, when receiving the conflicting data from a plurality of the data transfer units via a plurality of the input ports and executing the arbitration, a selection ratio which indicates a ratio of selecting each of the plurality of input ports and receiving the conflicting data from the selected input port, according to a ratio between the input ports in relation to magnitude of the value indicated by the strength information received from each of the input ports.

In a third exemplary aspect of the invention, a data transfer system includes: a plurality of processors; and a plurality of data transfer units that executes a data transfer from one processor to another processor included in the plurality of processors via a plurality of input ports and a plurality of output ports, in which the data transfer unit includes: a storage unit that stores transfer route number information indicating the number of transfer routes through which data is transferred to the input port from a plurality of the processors for each of the plurality of input ports that receive data from the plurality of data transfer units; and an arbitration unit that executes arbitration of two or more pieces of conflicting data which are sent to a same next destination, and in which the arbitration unit decides, when receiving the conflicting data from a plurality of the data transfer units via a plurality of the input ports and executing the arbitration, a selection ratio which indicates a ratio of selecting each of the plurality of input ports and receiving the conflicting data from the selected input port, according to a ratio between the input ports in relation to magnitude of the number of transfer route indicated by the transfer routes number information for each of the input ports.

In a fourth exemplary aspect of the invention, a switch to execute a data transfer from one processor included in a plurality of processors to other processor via a plurality of input ports and a plurality of output ports, the switch includes: an arbitration unit that executes arbitration of two or more pieces of includes data which are sent to a same next destination; and a strength information notification unit that sends strength information indicating a number of conflicts of the two or more pieces of arbitrated conflicting data to the next destination, in which the arbitration unit decides, when receiving the conflicting data from a plurality of the switches via a plurality of the input ports and executing the arbitration, a selection ratio which indicates a ratio of selecting each of the plurality of input ports and receiving the conflicting data from the selected input port, according to a ratio between the input ports in relation to magnitude of the number of conflicts indicated by the strength information received from each of the input ports In a fifth exemplary aspect of the invention, a data transfer method in each of a plurality of data transfer units executing a data transfer from one processor to another processor included in the plurality of processors via a plurality of input ports and a plurality of output ports, the data transfer method includes: executing an arbitration of two or more pieces of conflicting data which are sent to a same next destination; and sending strength information indicating a number of conflicts of the two or more pieces of arbitrated conflicting data to the next destination, in which in the execution of the arbitration, when receiving the conflicting data from a plurality of the data transfer units via a plurality of the input ports and executing the arbitration, a selection ratio, which is a ratio of selecting each of the plurality of input ports and receiving the conflicting data from the selected input port, is decided according to a ratio between the input ports in relation to magnitude of the number of conflicts indicated by the strength information received from each of the input ports.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENTS

First Exemplary Embodiment

Figure 1:
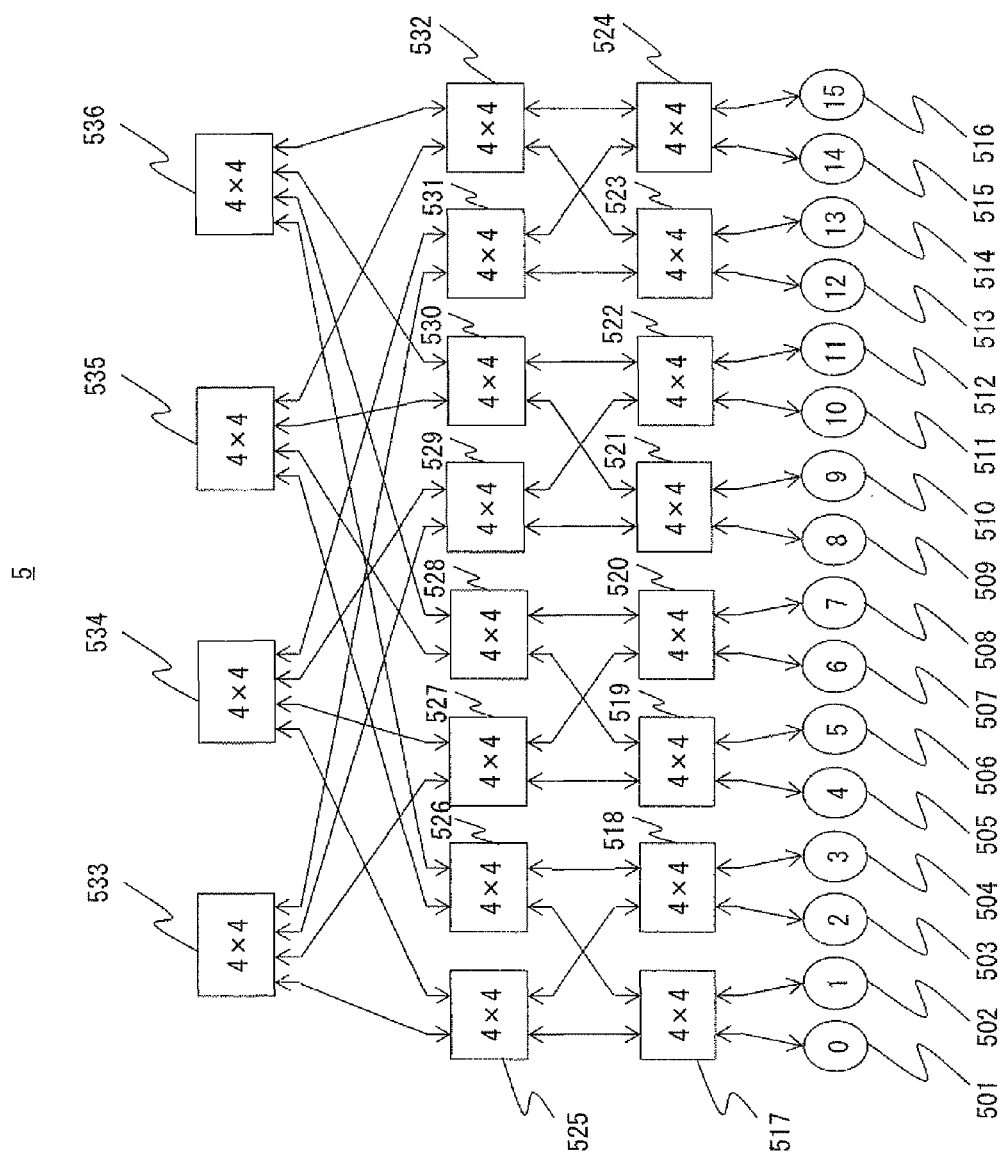
FIG. 1 is a diagram showing a configuration of a data transfer system which is an epitome of a parallel computer according to a first exemplary embodiment of the present invention.

A data transfer system 5 which is an epitome of a parallel computer according to a first exemplary embodiment of the present invention is explained with reference to FIG. 1. FIG. 1 is a diagram showing a configuration of the data transfer system 5 which is the epitome of the parallel computer according to the first exemplary embodiment of the present invention.

The data transfer system 5 includes a plurality of processors 501 to 516 and a plurality of data transfer units 517 to 536. Each of the data transfer units 517 to 536 executes a data transfer from one processor to another processor included in the plurality of processors 501 to 516 via a plurality of input ports and a plurality of output ports.

Figure 2:
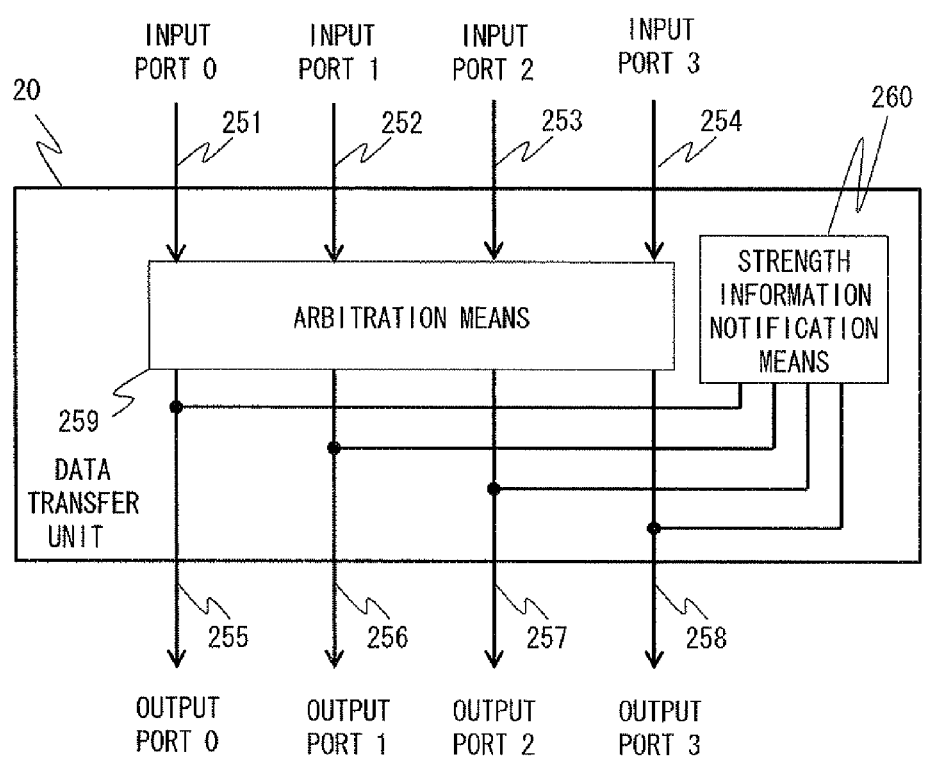
FIG. 2 is a diagram showing a configuration of a data transfer unit which is an epitome of a switch of the parallel computer according to the first exemplary embodiment of the present invention.

Next, a data transfer unit 20 which is an epitome of a switch of the parallel computer according to the first exemplary embodiment of the present invention is explained with reference to FIG. 2. FIG. 2 is a diagram showing a configuration of the data transfer unit 20 which is the epitome of the switch of the parallel computer according to the first exemplary embodiment of the present invention.

The data transfer unit 20 includes input ports 251 to 254, output ports 255 to 258, an arbitration means 259, and a strength information notification means 260.

Each of the input ports 251 to 254 receives data which is sent from one of the plurality of processors 501 to 516 and the plurality of data transfer units 517 to 536.

Each of the output ports 255 to 258 outputs data which is sent to one of the plurality of processors 501 to 516 and the plurality of data transfer units 517 to 536.

The arbitration means 259 executes arbitration of two or more pieces of conflicting data which are sent to a same next destination. Furthermore, when receiving the conflicting data from a plurality of the data transfer units via a plurality of the input ports and executing the arbitration, the arbitration means 259 decides a selection ratio according to a ratio between the input ports in relation to magnitude of a number of conflicts indicated by strength information received from each of the input ports. The selection ratio indicates a ratio of selecting each of the plurality of input ports and receiving the conflicting data from the selected input port.

The strength information notification means 260 sends the strength information to the next destination. The strength information indicates the number of conflicts of the two or more pieces of the arbitrated conflicting data.

Next, a processing of the data transfer unit 20 according to the first exemplary embodiment of the present invention is explained.

When receiving the two or more pieces of conflicting data which are sent to the same next destination from the plurality of data transfer units via each of the plurality of input ports, the arbitration means 259 executes the arbitration of the received conflicting data. In the arbitration, the arbitration means 259 decides a selection ratio according to a ratio between the input ports in relation to the number of conflicts indicated by the strength information received from each of the input ports. The selection ratio indicates a ratio of selecting each of the plurality of input ports and receiving the conflicting data from the selected input port. The arbitration means 259 executes the arbitration of the conflicting data according to the decided selection ratio. The strength information notification means 260 sends the strength information to the next destination. The strength information indicates the number of conflicts of the two or more pieces of the arbitrated conflicting data.

Figure 3:
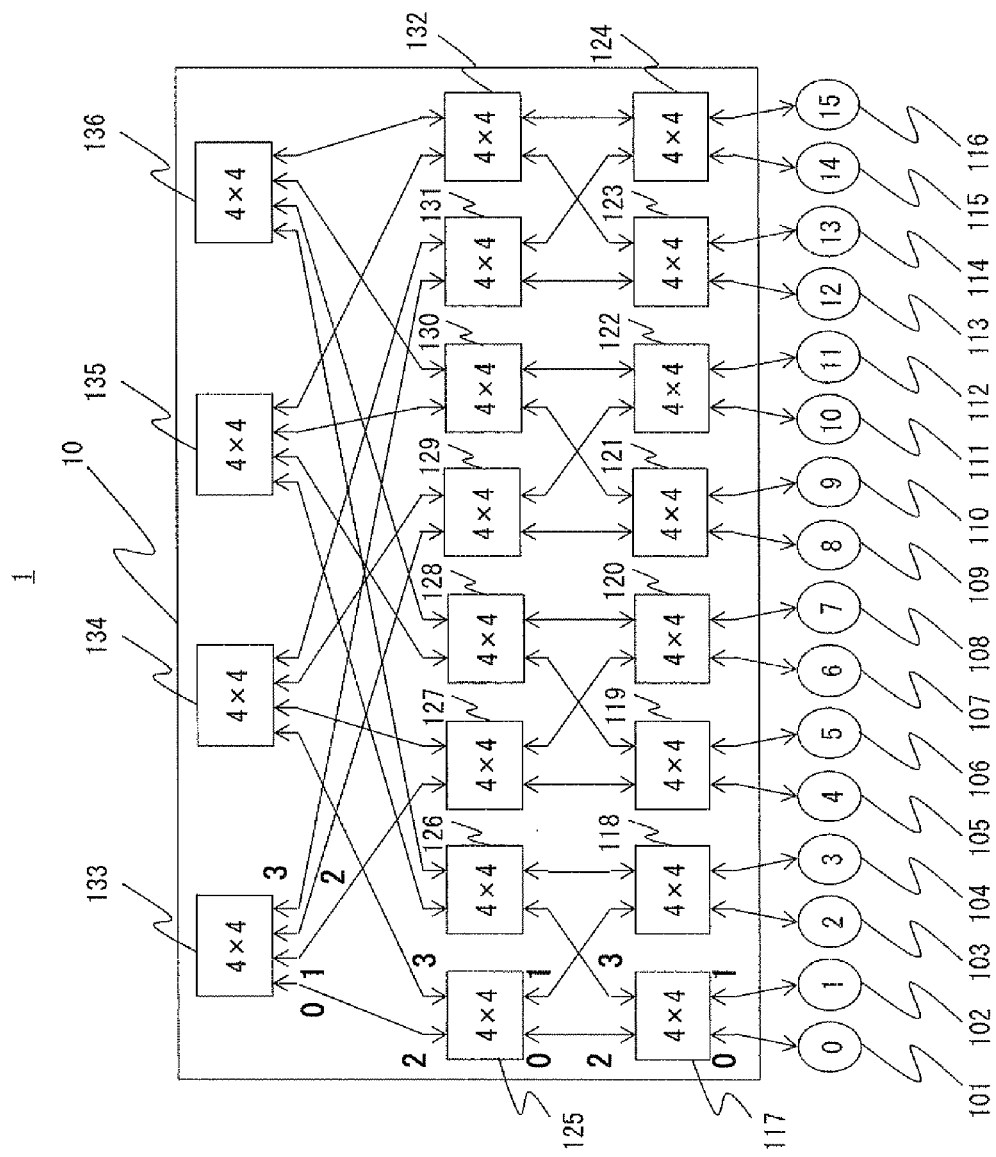
FIG. 3 is a diagram showing an inter-processor network of the parallel computer according to the first exemplary embodiment of the present invention.

Next, a parallel computer 1 according to the first exemplary embodiment of the present invention is explained in detail with reference to drawings. FIG. 3 shows the parallel computer 1 according to the first exemplary embodiment of the present invention.

The parallel computer 1 includes processors 101 to 116 and an inter-processor network 10. The inter-processor network 10 includes switches 117 to 136.

In FIG. 3, the plurality of processors 101 to 116 are connected by the inter-processor network 10. Here, though the parallel computer 1 in which the sixteen processors 101 to 116 are connected with the inter-processor network 10 is shown, any number of processors may be connected with the inter-processor network 10. The inter-processor network 10 includes four-input four-output switches 117 to 136. That is, each of the switches 117 to 136 includes four input ports and four output ports. The inter-processor network 10 has a Fat Tree topology.

Here, though the inter-processor network 10 includes the four-input four-output switches 117 to 136, the inter-processor network 10 may include N-input N-output switches (N is an arbitrary value). Here, the port numbers of each of the top switches 133 to 136 are numbered 0, 1, 2, and 3 in order from left to right. Furthermore, the port numbers of each of the middle switches 125 to 132 and the bottom switches 117 to 124 are numbered 0, 1 in order from left to right in the lower side and 2, 3 in order from left to right in the upper side.

That is, each of the switches 117 to 136 includes the four input ports having the port numbers 0 to 3 and the four output ports having the port numbers 0 to 3. Each of the input ports and the output ports having the port numbers 0 to 3 is connected with one of the processors or one of the switches as shown in FIG. 3. For example, the input port having the port number 0 of the switch 131 receives the packet which is output from the output port having the port number 2 of the switch 123. Furthermore, the output port having the port number 0 of the switch 131 output the packet to the input port having the port number 2 of the switch 123.

Figure 4:
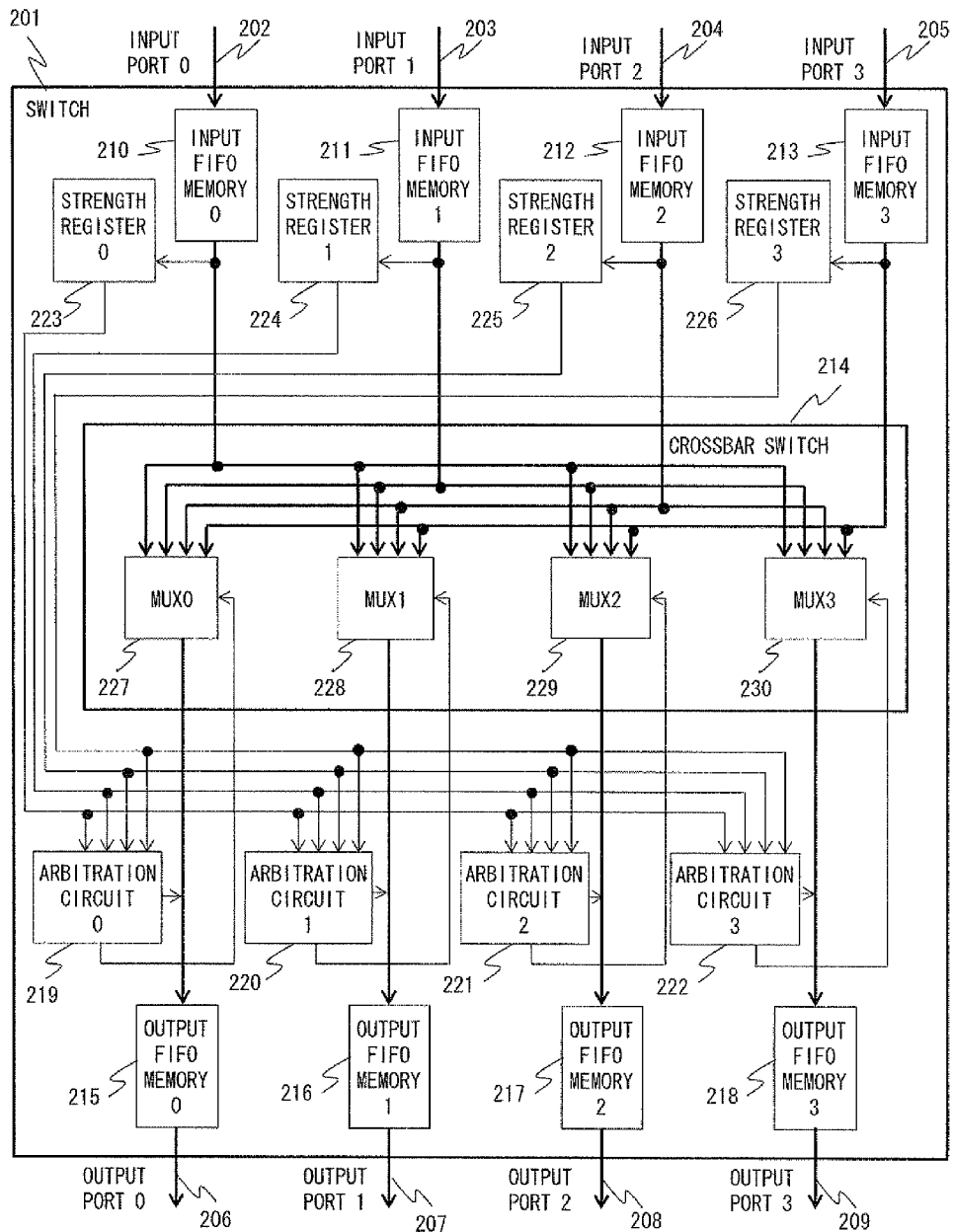
FIG. 4 is a diagram showing a configuration of the switch of the inter-processor network of the parallel computer according to the first exemplary embodiment of the present invention.

FIG. 4 shows an example of each of the four-input four-output switches 117 to 136 shown in FIG. 3. A switch 201 includes four input ports 202 to 205 and four output ports 206 to 209. The switch 201 includes input FIFO memories 210 to 213 and strength registers 223 to 226 to correspond to the input ports 202 to 205, respectively. Each of the strength registers 223 to 226 stores a strength in arbitration. Each of the input FIFO memories 210 to 213 stores the packet which is input to the input port corresponding to itself among the input ports 202 to 205 in a FIFO manner. Each of the input FIFO memories 210 to 213 outputs the strength in the arbitration which is included in the packet header in the packet stored in the head of the FIFO to each of the strength registers 223 to 226 corresponding to itself. For example, when the packet is not stored in the FIFO, each of the input FIFO memories 210 to 213 stores 0 in each of the strength registers 223 to 226. Note that, the strength in the arbitration which is included in the packet header in the packet is explained in detail later. Arbitration circuits 219 to 222 function as the arbitration means 259 and the strength information notification means 260.

Each of the strength registers 223 to 226 stores the strength in the arbitration which is output from each of the input FIFO memories 210 to 213. Each of the strength registers 223 to 226 outputs a signal indicating the strength in the arbitration stored in itself to each of the arbitration circuits 219 to 222. Each of the input FIFO memories 210 to 213 outputs the head packet stored in itself to multiplexers (MUX) 227 to 230. Furthermore, when outputting the packet, each of the input FIFO memories 210 to 213 outputs an arbitration participation signal (not shown) to the arbitration circuit corresponding to the output port to which the packet is output.

For example, each of the input FIFO memories 210 to 213 determines the output port to which the packet is output based on a destination processor number included in the packet header in the packet. For example, each of the input FIFO memories 210 to 213 stores a routing table to be able to seek the output port to which the packet should be output based on the destination processor number. Then, each of the input FIFO memories 210 to 213 determines the output port to which the packet is output based on the routing table stored in itself. Note that, the destination processor number included in the packet header in the packet is explained in detail later.

The switch 201 includes the arbitration circuits 219 to 222 and output FIFO memories 215 to 218 to correspond to the output ports 206 to 209, respectively. Furthermore, the switch 201 includes a crossbar switch 214. The crossbar switch 214 includes the multiplexers 227 to 230 to correspond to the output ports 206 to 209, respectively. The crossbar switch 214 connects the input FIFO memories 210 to 213 with the output FIFO memories 215 to 218.

Each of the arbitration circuits 219 to 222 routes the packet by controlling each of the multiplexers 227 to 230 in the crossbar switch 214 based on the signals, which indicate the strength in the arbitration, output from the strength registers 223 to 226 and the arbitration participation signals output from the input FIFO memories 210 to 213. Each of the multiplexers 227 to 230 selects one of the packets which are output from the input FIFO memories 210 to 213 according to the control by the arbitration circuit corresponding to itself. Each of the multiplexers 227 to 230 outputs the selected packet to the output FIFO memory corresponding to itself. Each of the output FIFO memories 215 to 218 stores the packet which is output from each of the multiplexers 227 to 230 in a FIFO manner. Each of the output FIFO memories 215 to 218 outputs the head packet stored in itself to the output port corresponding to itself.

Next, a detailed configuration of each of the arbitration circuits 219 to 222 is explained with reference to FIG. 5. An arbitration circuit 301 includes strength counters 302 to 305, a selection circuit 306, one-subtractors 307 to 310, multiplexers (MUX) 311 to 314, a strength calculation circuit 315, and a strength total register 316.

The arbitration circuit 301 receives strengths 317 to 320 and arbitration participation signals 321 to 324 each of which corresponds to each of the four input ports 202 to 205. The arbitration circuit 301 includes the four strength counters 302 to 305, the four one-subtractors 307 to 310, and the four multiplexers 311 to 314 to correspond to the input ports 202 to 205, respectively. Each of strengths 317 to 320 which are inputs to the arbitration circuit 301 is input to the multiplexer corresponding to itself and the strength calculation circuit 315. The arbitration participation signals 321 to 324 which are input to the arbitration circuit 301 are input to the selection circuit 306 and the strength calculation circuit 315.

Each of the multiplexers 311 to 314 selects the strength input to itself or a strength counter value output from the one-subtractor, and then outputs it to each of the strength counters 302 to 305. Each of the strength counters 302 to 305 stores the strength or the strength counter value output from each of the multiplexers 311 to 314 as the strength counter value. When doing a countdown of the strength counter value stored in each of the strength counters 302 to 305, each of the multiplexers 311 to 314 selects the strength counter value output from each of the one-subtractors 307 to 310 and outputs the selected strength counter value to each of the strength counters 302 to 305. Each of the strength counters 302 to 305 outputs the strength counter value to the selection circuit 306 and each of the one-subtractors 307 to 310.

The selection circuit 306 selects the packet of one input port based on the strength counter values output from the strength counters 302 to 305 and the arbitration participation signals 321 to 324. The selection circuit 306 outputs a selection signal to each of the multiplexers 227 to 230. The selection signal is a signal to perform a control to select and output the packet of the selected input port. A selection processing is explained with reference to FIG. 7 later.

The strength calculation circuit 315 calculates a total value of the strengths of the input ports which are participating with the arbitration using the strengths 317 to 320 and the arbitration participation signals 321 to 324. The strength calculation circuit 315 writes the calculated total value of strengths to the strength total register 316. Then, the arbitration circuit 301 writes the total value of strengths stored in the strength total register 316 to the packet header in the packet output from the crossbar switch 214.

Figure 6:
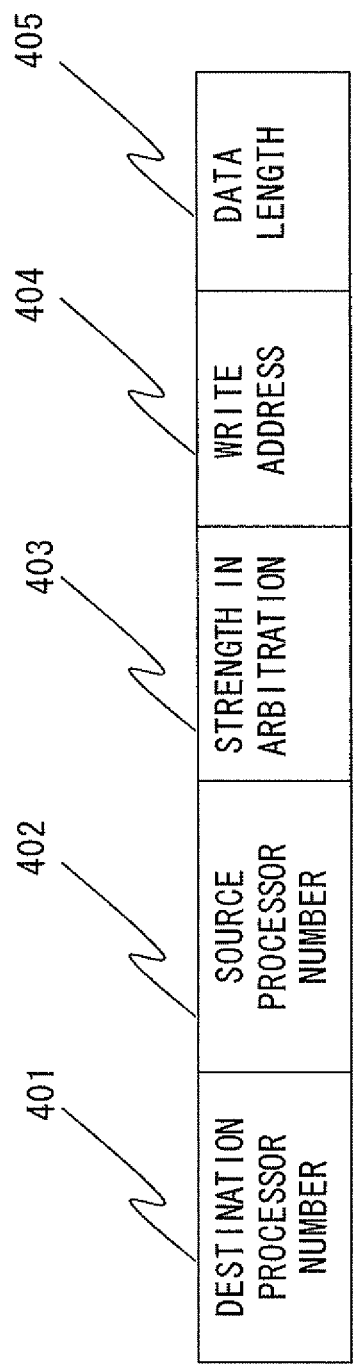
FIG. 6 is a diagram showing a packet header of a packet transferred in the parallel computer according to the first exemplary embodiment of the present invention.

Next, FIG. 6 shows the packet header in the packet according to the exemplary embodiment of the present invention. The packet header stores a destination processor number 401, a source processor number 402, a strength in arbitration 403, a write address 404, and a data length 405. The packet header is followed by data (not shown) having the number of bytes which is indicated by the data length 405. When sending the packet, each of the processors 101 to 116 initializes the strength of the arbitration 403 to 1. When going through each of the switches 117 to 136, the strength of the arbitration 403 is updated at each of the switches 117 to 136. The write address 404 is an address in memory to which the data is written when the packet arrives at the destination processor.

Figure 5:
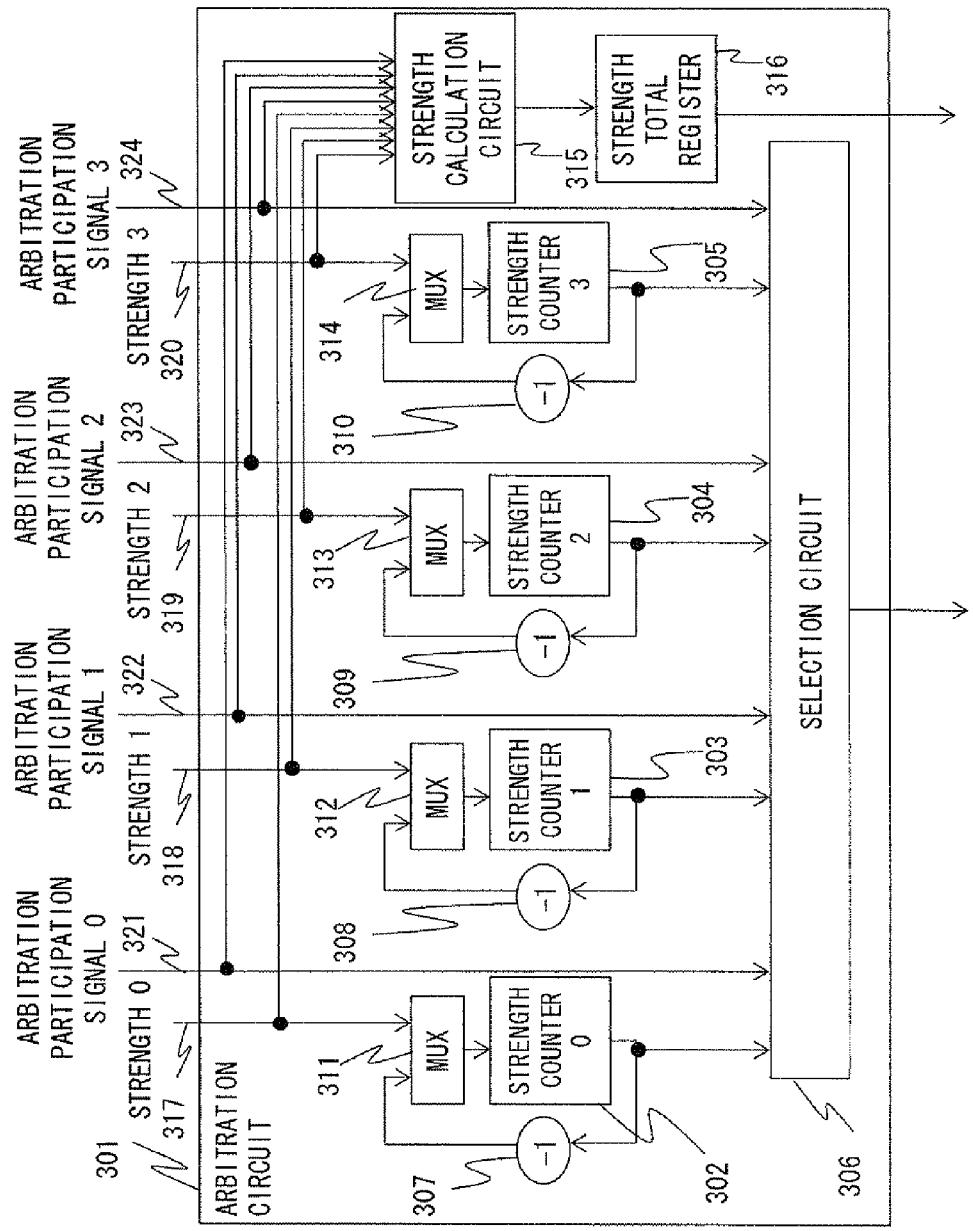
FIG. 5 is a diagram showing a configuration of an arbitration circuit of the switch of the inter-processor network of the parallel computer according to the first exemplary embodiment of the present invention.
Figure 7:
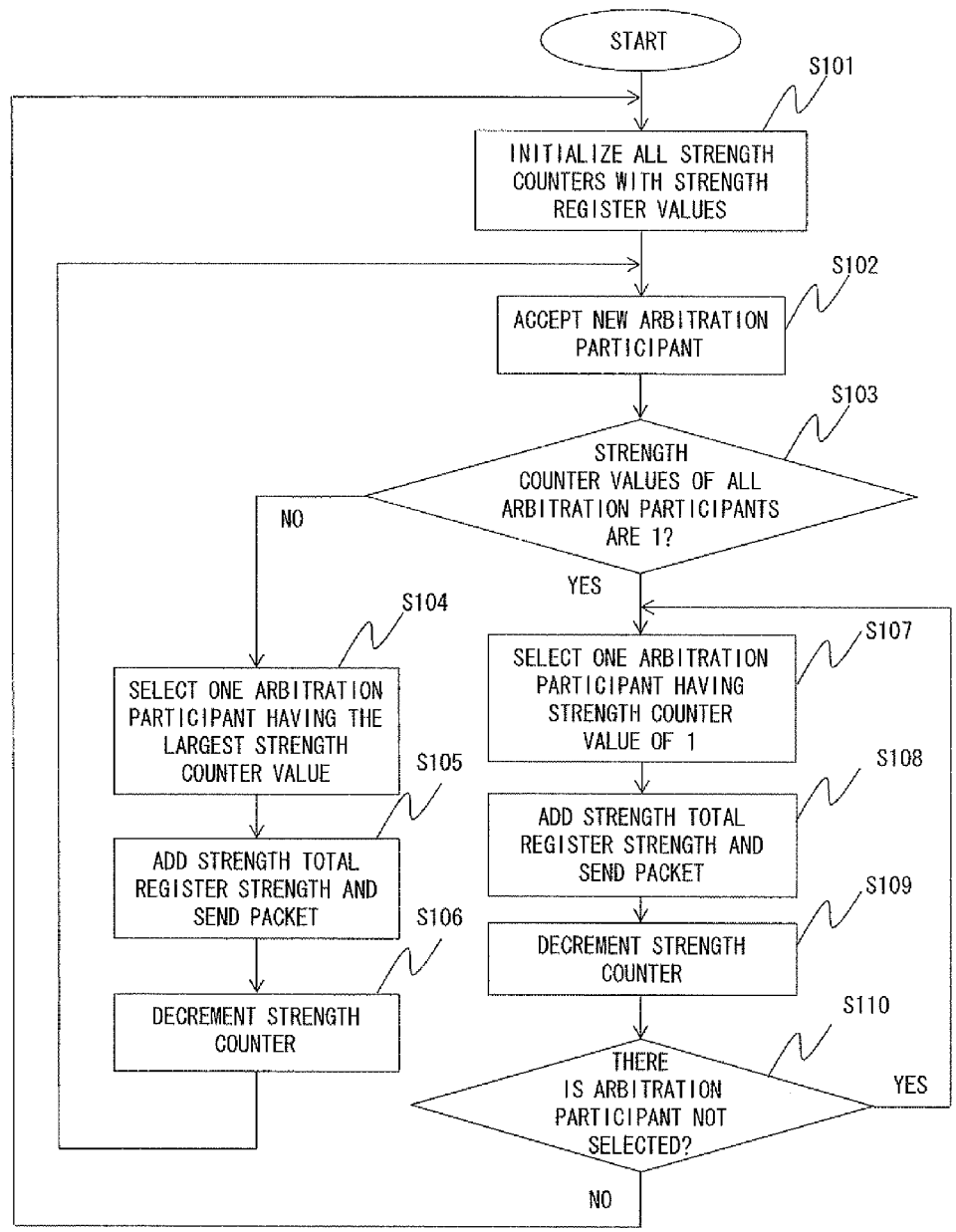
FIG. 7 is a flowchart to explain processing in the arbitration circuit of the parallel computer according to the first exemplary embodiment of the present invention.

Next, processing in the arbitration circuit 301 shown in FIG. 5 is explained with reference to FIG. 7.

First, the arbitration circuit 301 initializes all strength counters 302 to 305 to the strengths 317 to 320 output from the strength registers 223 to 226 (step S101). This is executed by selecting each of the strengths 317 to 320 in each of the multiplexers 311 to 314. Furthermore, at this time, the arbitration circuit 301 initializes the strength total register 316 by storing 0 in the strength total register 316.

Next, the selection circuit 306 accepts a new arbitration participant by referring to the arbitration participation signals 321 to 324 output from the input FIFO memories 210 to 213 (step S102). Specifically, when receiving the arbitration participation signal from one of the input FIFO memories 210 to 213, the selection circuit 306 decides the input port corresponding to the input arbitration participation signal as the arbitration participant. Furthermore, at this time, the strength calculation circuit 315 stores the total value of the strengths corresponding to the input ports participating with the arbitration in the strength total register 316. Hereafter, once the arbitration participant participates, the selection circuit 306 continues recognizing it as the arbitration participant until step S101 is executed again.

Next, the arbitration circuit 301 determines whether the values of the strength counters of all arbitration participants are 1 (step S103). If the values of the strength counters of all arbitration participants are not 1 (step S103: NO), the selection circuit 306 selects the arbitration participant having the largest value of the strength counter (step S104). Specifically, the selection circuit 306 outputs the selection signal to the multiplexer in the crossbar switch 214. The selection signal is a signal to select the packet output from the input FIFO memory of the input port corresponding to the strength counter outputting the largest strength counter value. Note that, when the arbitration participation signal is not output from the input FIFO memory from which the packet is selected, the selection circuit 306 waits until the arbitration participation signal is output, and then selects the packet output from the input FIFO memory. This prevents the packet which should be output to the output port other than the output port corresponding to the arbitration circuit including the selection circuit from being output to the output port by mistake. When the packet has gone through the crossbar switch 214, the arbitration circuit 301 writes the total value of strengths stored in the strength total register 316 to the field of the strength in the arbitration in the packet header (step S105).

Then, the selection circuit 306 decrements the value of the strength counter corresponding to the input port selected as the arbitration participant having the largest strength counter value (step S106). The decrement of the value of each of the strength counters 302 to 305 is executed by selecting the output of each of the one-subtractors 307 to 310 by each of the multiplexers 311 to 314. For example, this selection is executed by outputting a selection signal from the selection circuit 306 to select the output from each of the one-subtractors 307 to 310 to each of the multiplexers 311 to 314.

Hereafter, going to the step S102, the selection circuit 306 accepts a new arbitration participant by referring to the arbitration participation signals 321 to 324 which are output from the input FIFO memory (step S102). At this time, the input FIFO memory that stores the selected packet makes the packet included in the FIFO next to the selected packet into the head packet of the FIFO. Then, the input FIFO memory outputs the head packet to the multiplexers 227 to 230. Furthermore, at this time, if the arbitration participation signal corresponding to the input port which is not selected as the arbitration participant is newly input, the selection circuit 306 accepts the input port as a new arbitration participant. In that case, the selection circuit 306 initializes the strength counter corresponding to the input port. Furthermore, the strength calculation circuit 315 stores a total value of strength corresponding to the input port participating as the new arbitration participant and the total value of strengths stored in the strength total register 316 in the strength total register 316.

Next, the case in which the values of the strength counters of all arbitration participants are 1 at the step S103 is explained (step S103: Yes). The arbitration circuit 301 selects one of the arbitration participants having the value of the strength counter of 1 (step S107). The way to select the arbitration participant may be either by a designated priority or a round robin. Then, the selection circuit 306 outputs the selection signal to the multiplexer of the crossbar switch 214. The selection signal is to select the packet output from the input FIFO memory corresponding to the selected input port. When the packet has gone through the crossbar switch 214, the arbitration circuit 301 writes the total value of strengths stored in the strength total register 316 to the field of the strength in the arbitration in the packet header (step S108). Then, the selection circuit 306 decrements the value of the strength counter corresponding to the selected input port (step S109). Next, the arbitration circuit 301 determines whether there is the arbitration participant which is not selected among the arbitration participants in which the values of the strength counters have become 1 (step S110). That is, the arbitration circuit 301 determines whether there is the arbitration participant corresponding to the strength counter in which the value does not become 0. If there is the arbitration participant which is not selected (step S110: Yes), the process goes back to the step S107. Otherwise (step S110: No), the process goes back to the step S101, where the strength counters 302 to 305 are initialized.

As explained above, the arbitration circuit 301 treats the strength included in the packet which is input to each of the input ports participating with the arbitration as the number of packets which are selected from each of the input ports and are output to the next stage. In other words, the arbitration circuit 301 treats the strength included in the packet which is input to each of the input ports participating with the arbitration as the number of packets which are taken from each of the input ports as an object of the arbitration. Therefore, the total value of the strength from each of the input ports participating with the arbitration is the number of packets which are treated by the arbitration circuit 301 as the object of the arbitration. In other words, the total value of strengths is the number of conflicts of the packets arbitrated by the arbitration circuit 301 due to their output conflict. Then, the arbitration circuit 301 includes the total value of strengths in the packet as the strength, and then outputs the packet to the next stage. This enables each of the switches to transmit a degree of that the packets transmitted to the next stage converge on itself to the switch of the next stage as the strength for each of the plurality of switches of the next stage.

Furthermore, the arbitration circuit 301 selects the number of packets equivalent to the number of conflicts indicated by the strength included in the packet which is input to each of the input ports from each of the input ports, and then outputs the selected packet to the next stage. This enables the arbitration circuit 301 to output more packets to the next stage from the input port to which the packet is input from the switch outputting more packets.

Next, a behavior and an advantage of the first exemplary embodiment of the present invention in the case in which the processor 0 (101) to the processor 14 (115) communicate with the processor 15 (116) are explained with reference to FIG. 8 to FIG. 14.

Figure 8A:
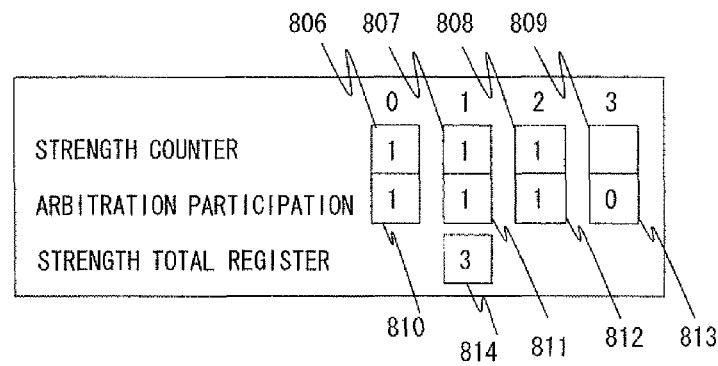
FIG. 8A is a diagram showing an example of a state of the arbitration circuit of the parallel computer according to the first exemplary embodiment of the present invention.
Figure 8B:
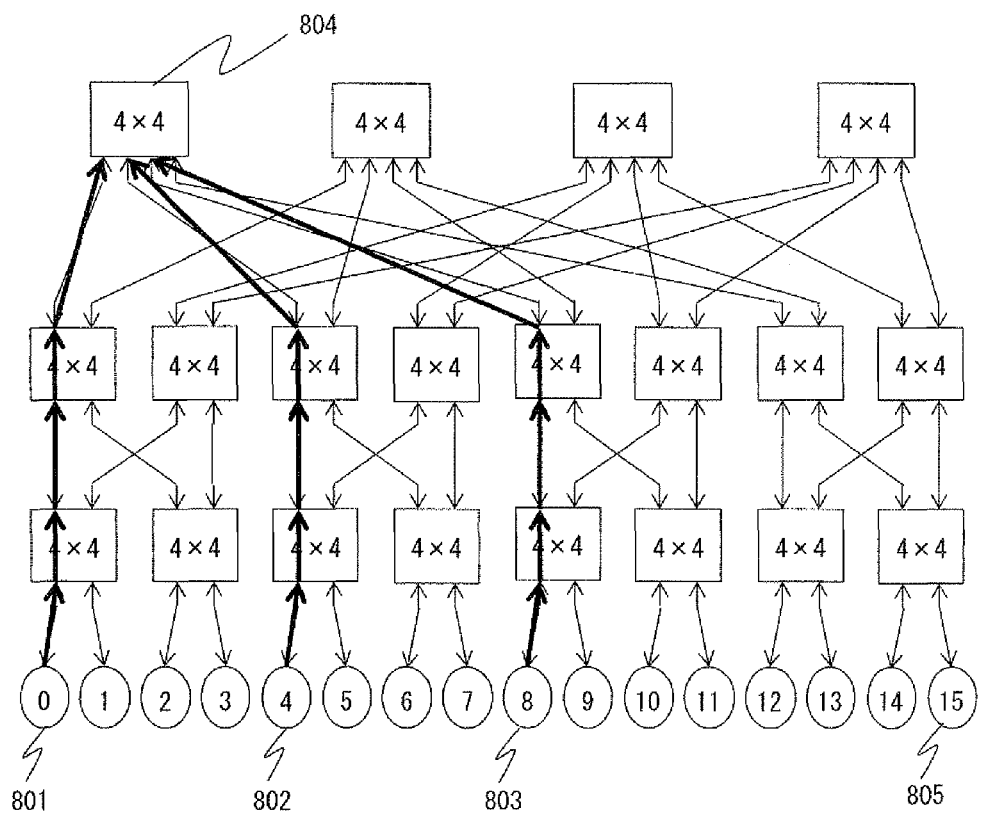
FIG. 8B is a diagram showing an example of a state in which the packets conflict in the switch of the parallel computer according to the first exemplary embodiment of the present invention.

FIG. 8B is a diagram showing an example of a state in which the packets conflict in a switch 804. FIG. 8B exemplifies the case in which the packets which are sent from a processor 0 (801), a processor 4 (802), and a processor 8 (803) to a processor 15 (805) conflict in the switch 804. FIG. 8A shows a state of the arbitration circuit 301 of the output port 3 in the switch 804. Each of strength counters 806 to 808 of the input ports 0 to 2 stores the strength in the arbitration of 1 of the packet header in the packet which is sent from each of the processors 801 to 803 as an initial value. Furthermore, since the input ports 0 to 2 participate with the arbitration, arbitration participations 810 to 812 store 1, and an arbitration participation 813 stores 0.

Note that, for example, each of the arbitration participations 810 to 813 is an arbitration participation register included in the arbitration circuit 301. The arbitration circuit 301 includes the arbitration participation registers each of which corresponds to each of the input ports 0 to 3. When the arbitration participation signal is input in the step S102, the arbitration circuit 301 stores 1 in the arbitration participation register of the input port corresponding to the arbitration participation signal. The arbitration circuit 301 initializes the arbitration participation register by storing 0 therein.

A strength total register 814 stores 3 which is the total of the strength in the arbitration. The arbitration circuit 301 stores 3 in the strength in the arbitration of the packet header in the packet which goes through the switch 804 and is output to the output port 3. After the strength counters are initialized in step S101 shown in FIG. 7, all the values of the strength counters 806 to 808 of the input ports 0 to 2 participating with the arbitration are 1. Therefore, after the step S103, the arbitration circuit 301 executes the processing of the step S107.

Figure 9A:
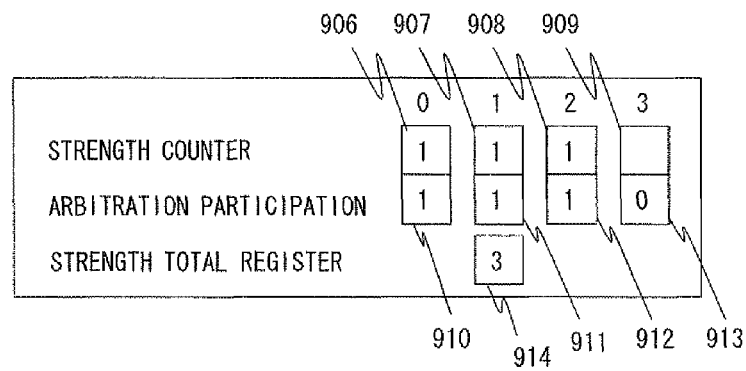
FIG. 9A is a diagram showing an example of a state of the arbitration circuit of the parallel computer according to the first exemplary embodiment of the present invention.
Figure 9B:
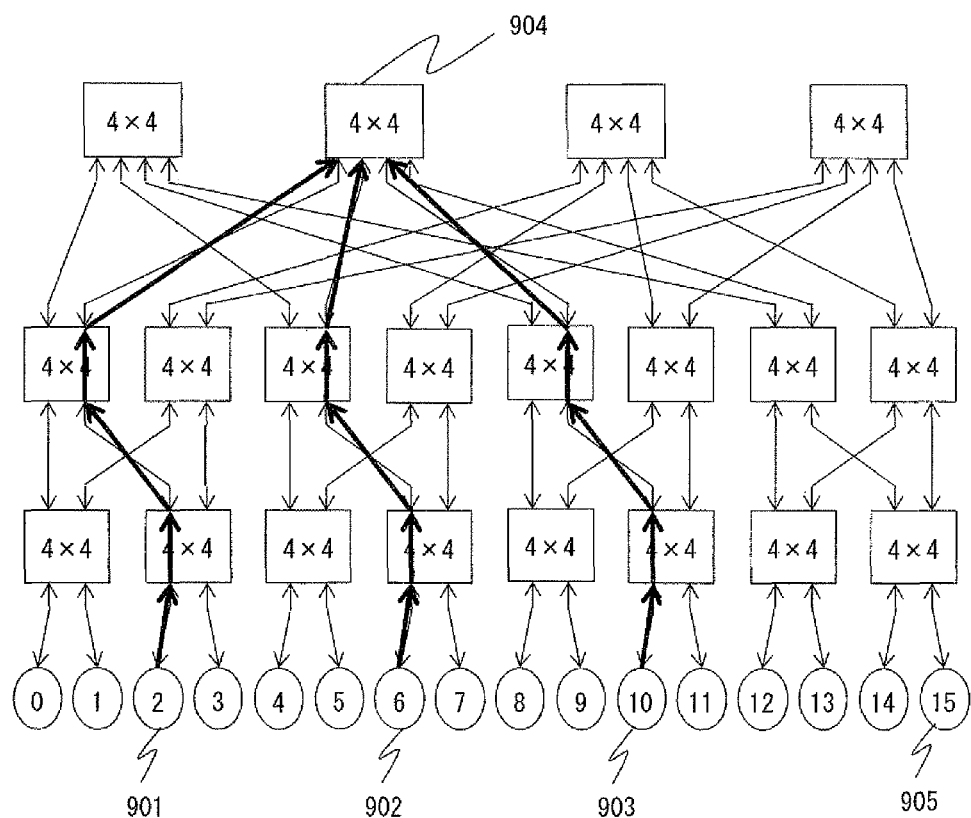
FIG. 9B is a diagram showing an example of a state in which the packets conflict in the switch of the parallel computer according to the first exemplary embodiment of the present invention.

FIG. 9B is a diagram showing an example of a state in which the packets conflict in a switch 904. FIG. 9B exemplifies the case in which the packets which are sent from a processor 2 (901), a processor 6 (902), and a processor 10 (903) to a processor 15 (905) conflict in the switch 904. FIG. 9A shows a state of the arbitration circuit 301 of the output port 3 in the switch 904. Each of strength counters 906 to 908 of the input ports 0 to 2 stores the strength in the arbitration of 1 of the packet header in the packet sent from each of the processors 901 to 903 as an initial value. Furthermore, since the input ports 0 to 2 participate with the arbitration, arbitration participations 910 to 912 store 1, and an arbitration participation 913 stores 0. A strength total register 914 stores 3 which is the total of the strength in the arbitration. The arbitration circuit 301 stores 3 in the strength in the arbitration of the packet header in the packet which goes through the switch 904 and is output to the output port 3. After the strength counters are initialized in step S101 shown in FIG. 7, all the values of the strength counters 906 to 908 of the input ports 0 to 2 participating with the arbitration are 1. Therefore, after the step S103, the arbitration circuit 301 executes the processing of the step S107.

Figure 10A:
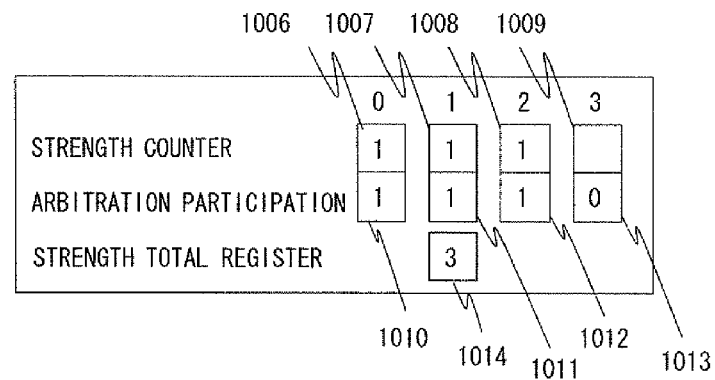
FIG. 10A is a diagram showing an example of a state of the arbitration circuit of the parallel computer according to the first exemplary embodiment of the present invention.
Figure 10B:
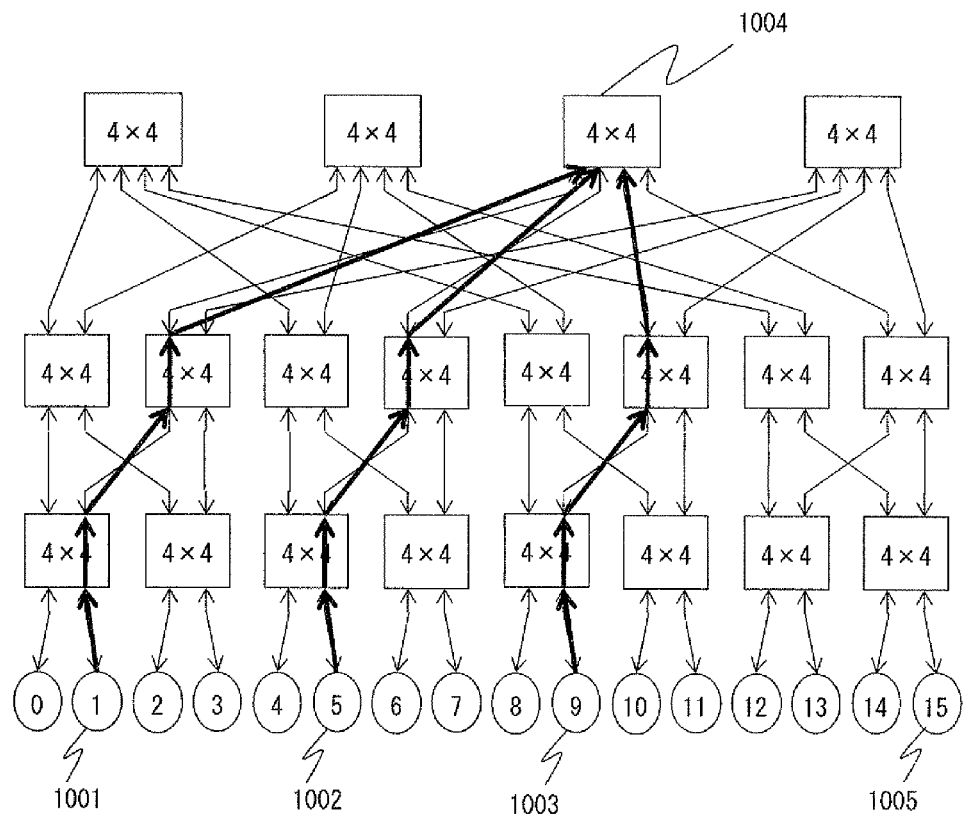
FIG. 10B is a diagram showing an example of a state in which the packets conflict in the switch of the parallel computer according to the first exemplary embodiment of the present invention.

FIG. 10B is a diagram showing an example of a state in which the packets conflict in a switch 1004. FIG. 10B exemplifies the case in which the packets which are sent from a processor 1 (1001), a processor 5 (1002), and a processor 9 (1003) to a processor 15 (1005) conflict in the switch 1004. FIG. 10A shows a state of the arbitration circuit 301 of the output port 3 in the switch 1004. Each of strength counters 1006 to 1008 of the input ports 0 to 2 stores the strength in the arbitration of 1 of the packet header in the packet sent from each of the processors 1001 to 1003 as an initial value. Furthermore, since the input ports 0 to 2 participate with the arbitration, arbitration participations 1010 to 1012 store 1, and an arbitration participation 1013 stores 0. A strength total register 1014 stores 3 which is the total of the strength in the arbitration. The arbitration circuit 301 stores 3 in the strength in the arbitration of the packet header in the packet which goes through the switch 1004 and is output to the output port 3. After the strength counters are initialized in step S101 shown in FIG. 7, all the values of the strength counters 1006 to 1008 of the input ports 0 to 2 participating with the arbitration are 1. Therefore, after the step S103, the arbitration circuit 301 executes the processing of the step S107.

Figure 11A:
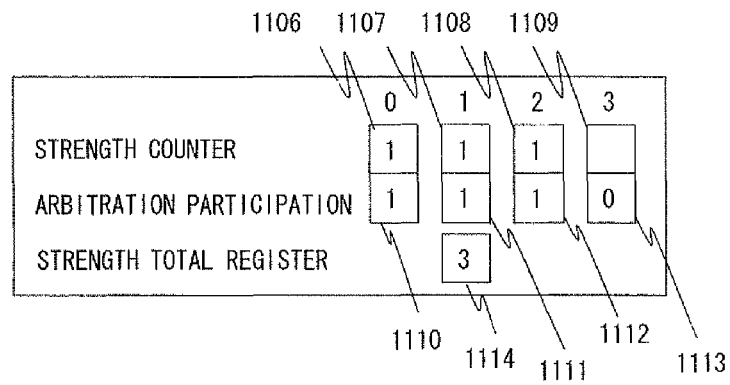
FIG. 11A is a diagram showing an example of a state of the arbitration circuit of the parallel computer according to the first exemplary embodiment of the present invention.
Figure 11B:
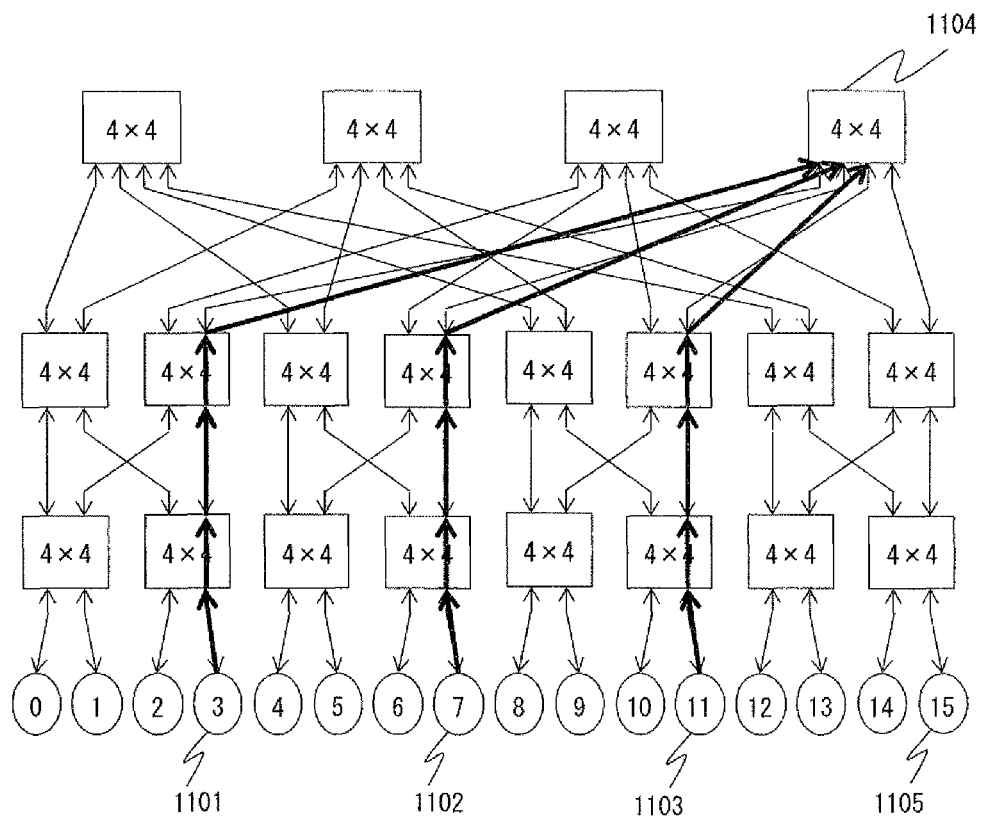
FIG. 11B is a diagram showing an example of a state in which the packets conflict in the switch of the parallel computer according to the first exemplary embodiment of the present invention.

FIG. 11B is a diagram showing an example of a state in which the packets conflict in a switch 1104. FIG. 11B exemplifies the case in which the packets which are sent from a processor 3 (1101), a processor 7 (1102), and a processor 11 (1103) to a processor 15 (1105) conflict in the switch 1104. FIG. 11A shows a state of the arbitration circuit 301 of the output port 3 in the switch 1104. Each of strength counters 1106 to 1108 of the input ports 0 to 2 stores the strength in the arbitration of 1 of the packet header in the packet sent from each of the processors 1101 to 1103 as an initial value. Furthermore, since the input ports 0 to 2 participate with the arbitration, arbitration participations 1110 to 1112 store 1, and an arbitration participation 1113 stores 0. A strength total register 1114 stores 3 which is the total of the strength in the arbitration. The arbitration circuit 301 stores 3 in the strength in the arbitration of the packet header in the packet which goes through the switch 1104 and is output to the output port 3. After the strength counters are initialized in step S101 shown in FIG. 7, all the values of the strength counters 1106 to 1108 of the input ports 0 to 2 participating with the arbitration are 1. Therefore, after the step S103, the arbitration circuit 301 executes the processing of the step S107.

Figure 12A:
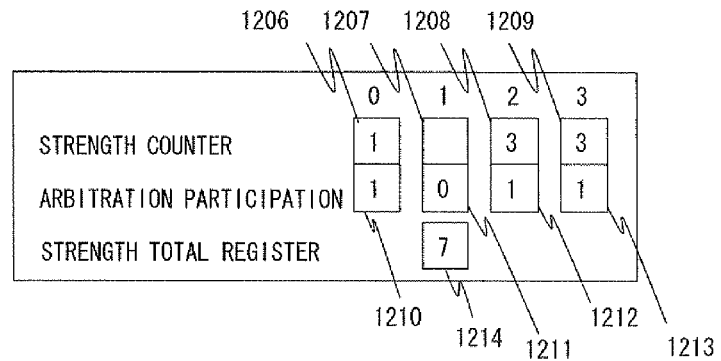
FIG. 12A is a diagram showing an example of a state of the arbitration circuit of the parallel computer according to the first exemplary embodiment of the present invention.
Figure 12B:
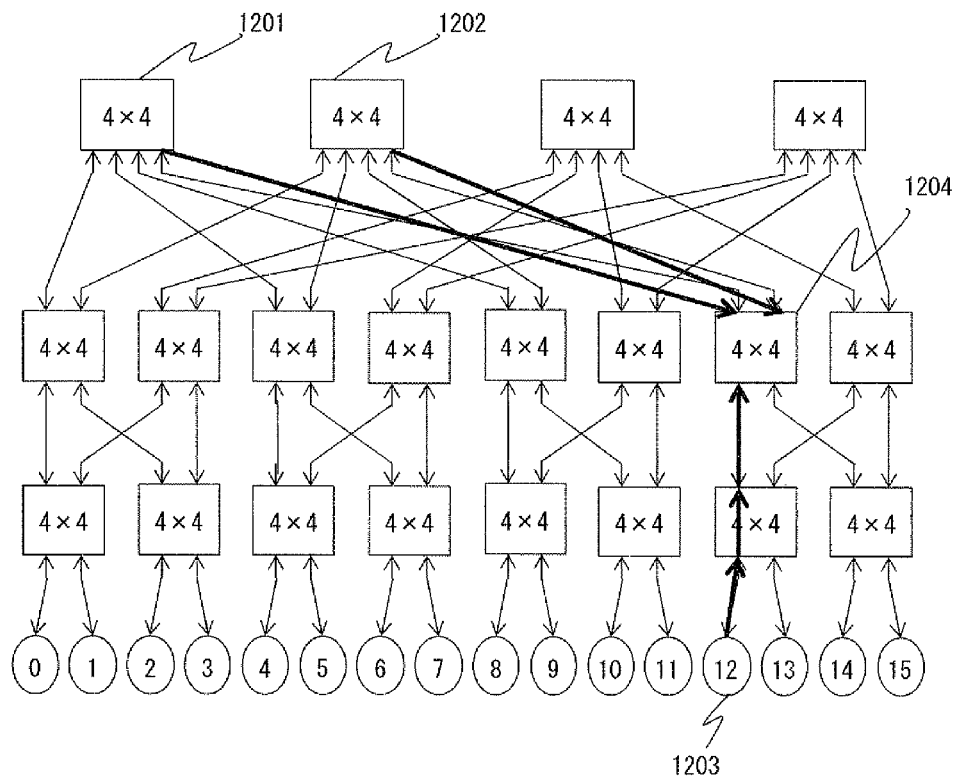
FIG. 12B is a diagram showing an example of a state in which the packets conflict in the switch of the parallel computer according to the first exemplary embodiment of the present invention.

FIG. 12B is a diagram showing an example of a state in which the packets conflict in a switch 1204. FIG. 12B exemplifies the case in which the packets which are sent from a processor 12 (1203), a switch 1201, and a switch 1202 conflict in a switch 1204. FIG. 12A shows a state of the arbitration circuit 301 of the output port 1 in the switch 1204. A strength counter 1206 of the input port 0 stores the strength in the arbitration of 1 of the packet header in the packet sent from the processors 12 (1203) as an initial value. Furthermore, each of strength counters 1208 and 1209 of the input port 2 and the input port 3 stores the strength in the arbitration of 3 of the packet header in the packet sent from each of the switch 1201 and the switch 1202 as an initial value. That is, here, the case in which the packets conflict in each of the switch 1201 and the switch 1202 and the strength in the arbitration of the packet header is updated to 3 is explained.

Furthermore, since the input port 0, input port 2, and input port 3 participate with the arbitration, arbitration participations 1210, 1212, and 1213 store 1, and an arbitration participation 1211 stores 0. A strength total register 1214 stores 7 which is the total of the strength in the arbitration. The arbitration circuit 301 stores 7 in the strength in the arbitration of the packet header in the packet which goes through the switch 1204 and is output to the output port 1. After the arbitration circuit 301 initializes the strength counters in step S101 shown in FIG. 7, all the values of the strength counters of the arbitration participants are 1, 3, and 3. Therefore, until the values of the strength counters become 1, 1, 1, the arbitration circuit 301 executes the processing of the step S104 after the step S103. In the processing of the step S104 executed at this time, the packet from the input port 2 and the input port 3 is selected. When the values of the strength counters become 1, 1, 1, the arbitration circuit 301 executes the processing of the step S107 after the step S103. Then, in the processing of steps S107 to S110, one packet is selected from each of the input port 0, input port 2, and input port 3.

Figure 13A:
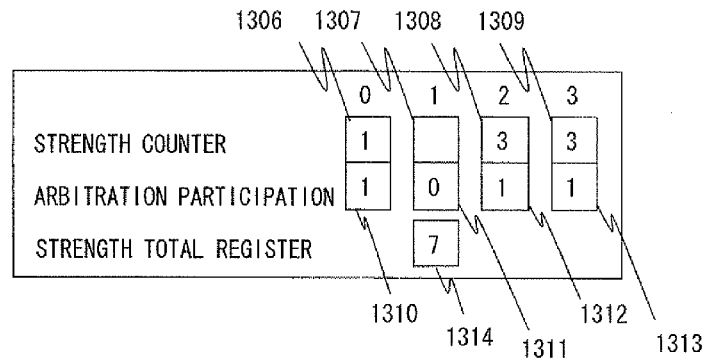
FIG. 13A is a diagram showing an example of a state of the arbitration circuit of the parallel computer according to the first exemplary embodiment of the present invention.
Figure 13B:
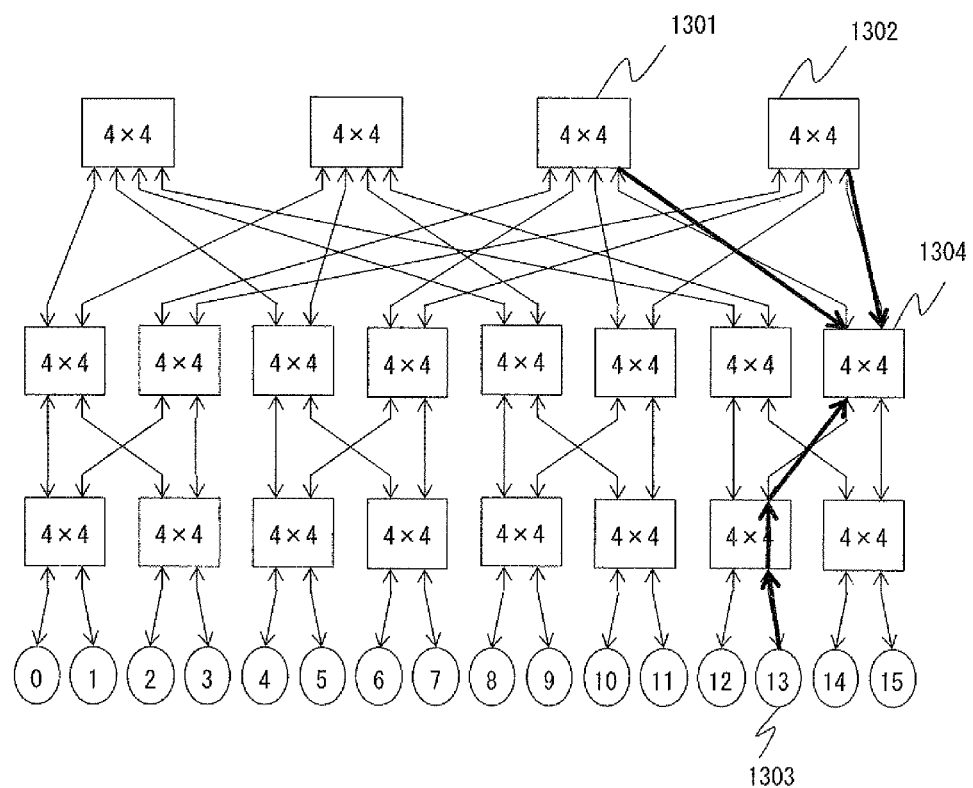
FIG. 13B is a diagram showing an example of a state in which the packets conflict in the switch of the parallel computer according to the first exemplary embodiment of the present invention.

FIG. 13B is a diagram showing an example of a state in which the packets conflict in a switch 1304. FIG. 13B exemplifies the case in which the packets which are sent from a processor 13 (1303), a switch 1301, and a switch 1302 conflict in the switch 1304. FIG. 13A shows a state of the arbitration circuit 301 of the output port 1 in the switch 1304. A strength counter 1306 of the input port 0 stores the strength in the arbitration of 1 of the packet header in the packet sent from the processors 13 (1303) as an initial value. Furthermore, each of strength counters 1308 and 1309 of the input port 2 and the input port 3 stores the strength in the arbitration of 3 of the packet header in the packet sent from each of the switch 1301 and the switch 1302 as an initial value. That is, here, the case in which the packets conflict in each of the switch 1301 and the switch 1302 and the strength in the arbitration of the packet header is updated to 3 is explained.

Furthermore, since the input port 0, input port 2, and input port 3 participate with the arbitration, arbitration participations 1310, 1312, and 1313 store 1, and an arbitration participation 1311 stores 0. A strength total register 1314 stores 7 which is the total of the strength in the arbitration. The arbitration circuit 301 stores 7 in the strength in the arbitration of the packet header in the packet which goes through the switch 1304 and is output to the output port 1. After the arbitration circuit 301 initializes the strength counters in step S101 shown in FIG. 7, all the values of the strength counters of the arbitration participants are 1, 3, and 3. Therefore, until the values of the strength counters become 1, 1, 1, the arbitration circuit 301 executes the processing of the step S104 after the step S103. In the processing of the step S104 executed at this time, the packet from the input port 2 and the input port 3 is selected. When the values of the strength counters become 1, 1, 1, the arbitration circuit 301 executes the processing of the step S107 after the step S103. Then, in the processing of steps S107 to S110, one packet is selected from each of the input port 0, input port 2, and input port 3.

Figure 14A:
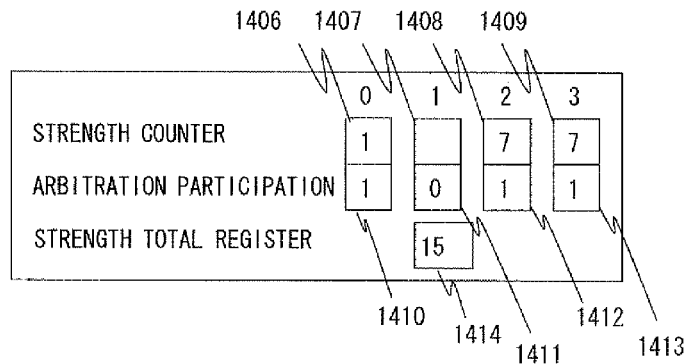
FIG. 14A is a diagram showing an example of a state of the arbitration circuit of the parallel computer according to the first exemplary embodiment of the present invention.
Figure 14B:
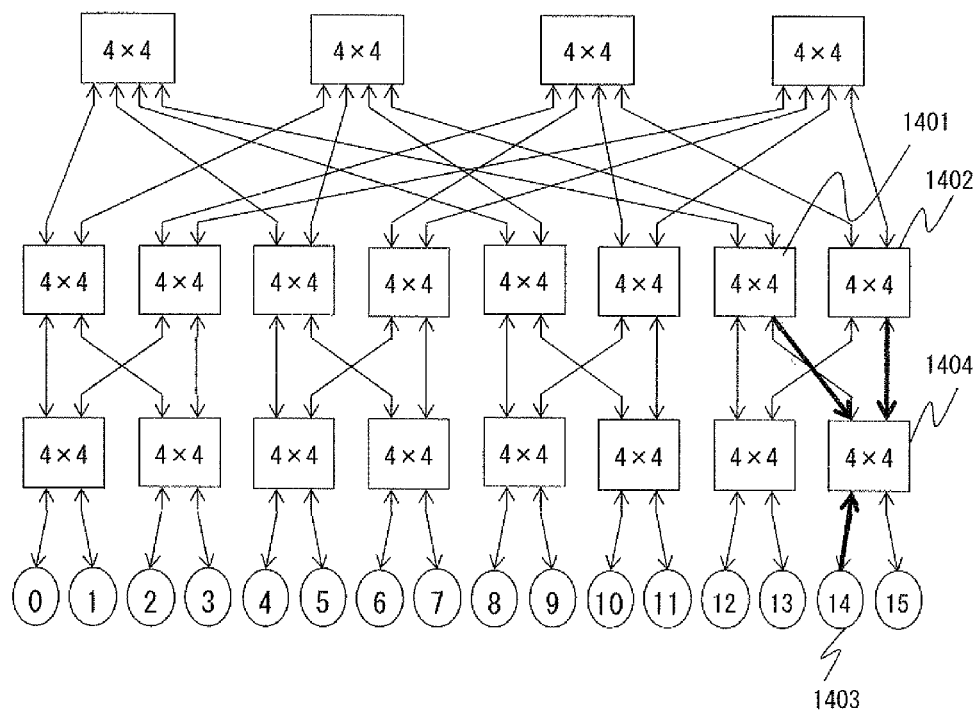
FIG. 14B is a diagram showing an example of a state in which the packets conflict in the switch of the parallel computer according to the first exemplary embodiment of the present invention.

FIG. 14B is a diagram showing an example of a state in which the packets conflict in a switch 1404. FIG. 14B exemplifies the case in which the packets which are sent from the processor 14 (1403), a switch 1401, and a switch 1402 conflict in the switch 1404. FIG. 14A shows a state of the arbitration circuit 301 of the output port 1 in the switch 1404. A strength counter 1406 of the input port 0 stores the strength in the arbitration of 1 of the packet header in the packet sent from the processor 14 (1403) as an initial value. Furthermore, each of strength counters 1408 and 1409 of the input port 2 and input port 3 stores the strength in the arbitration of 7 of the packet header in the packet sent from each of the switch 1401 and the switch 1402 as an initial value. That is, here, the case in which the packets conflict in each of the switches 1401 and 1402 and each of the switches of the previous stages of the switches 1401 and 1402, and the strength in the arbitration of the packet header is updated to 7 is explained.

Furthermore, since the input port 0, input port 2, and input port 3 participate with the arbitration, arbitration participations 1410, 1412, and 1413 store 1, and an arbitration participation 1411 stores 0. A strength total register 1414 stores 15 which is the total of the strength in the arbitration. The arbitration circuit 301 stores 15 in the strength in the arbitration of the packet header in the packet which goes through the switch 1404 and is output to the output port 1. After the arbitration circuit 301 initializes the strength counters in step S101 shown in FIG. 7, all the values of the strength counters of the arbitration participants are 1, 7, and 7. Therefore, until the values of the strength counters become 1, 1, 1, the arbitration circuit 301 executes the processing of the steps S104 after the step S103. In the processing of the step S104 executed at this time, the packet from the input port 2 and the input port 3 is selected. When the values of the strength counters become 1, 1, 1, the arbitration circuit 301 executes the processing of the step S107 after the step S103. Then, in the processing of steps S107 to S110, one packet is selected from each of the input port 0, input port 2, and input port 3.

Next, an arrival probability from each of the processors to the processor 15 is calculated in this first exemplary embodiment. Here, the arrival probabilities of the packets from the processor 0, the processor 12, and the processor 14 are calculated. In these packets, the number of switches through which the packet goes varies. First, the packet from the processor 0 goes through the three switches. If the three packets conflict in each of the switches, the probability of selecting the packet sent from the processor 0 in each of the switches are one third, three seventh, and seven fifteenth. Therefore, the product of these probabilities is one fifteenth. Next, the packet from the processor 12 goes through the two switches. If the three packets conflict in each of the switches, the probability of selecting the packet sent from the processor 12 in each of the switches are one seventh and seven fifteenth. Therefore, the product of these probabilities is one fifteenth. Finally, the packet from the processor 14 goes through one switch. If the three packets conflict in this switch, the probability of selecting the packet sent from the processor 14 in the switch is one fifteen.

In this manner, in this exemplary embodiment, even if the number of switches through which each of the packets goes as with the packets output from each of the processors 0 to 14 to the processor 15 varies, the probability of arriving at the processor 15 without waiting is one fifteenth. Therefore, it turns out that the probability of arriving at the destination processor is the same in the packets which are output from any processor. In other words, the time until the packet arrives at the destination processor is constant in the packet output from any processor. That is, this first exemplary embodiment of the present invention can reduce the variance of the transfer time of the packets transferred between processors to solve the above problem.

Second Exemplary Embodiment

Figure 15:
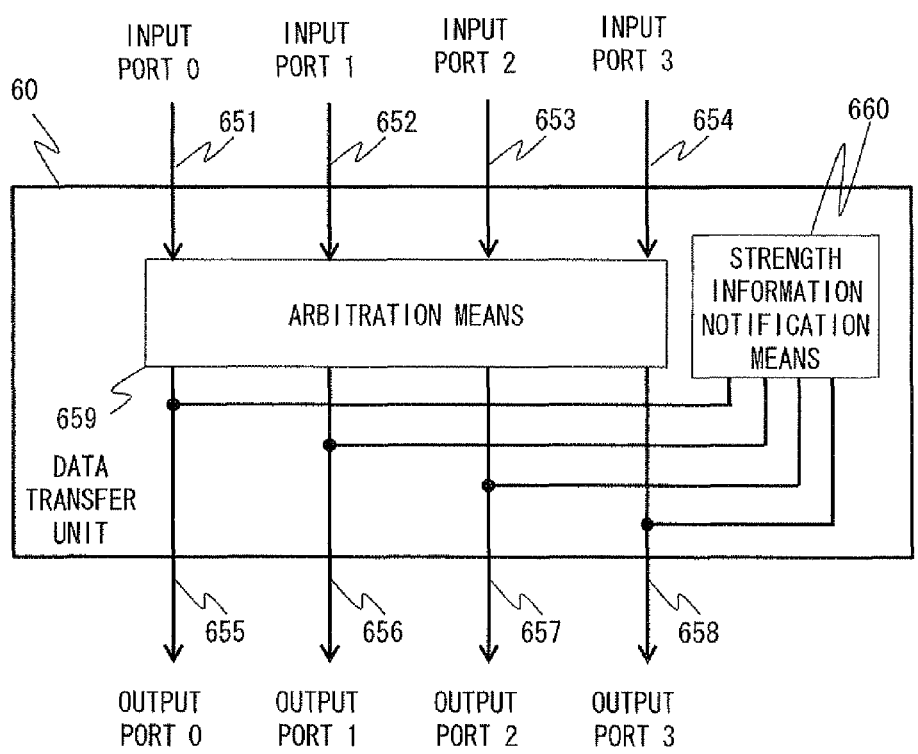
FIG. 15 is a diagram showing a configuration of a data transfer unit which is an epitome of a switch of a parallel computer according to a second exemplary embodiment of the present invention.

Next, a data transfer unit 60 which is an epitome of a switch of a parallel computer according to a second exemplary embodiment of the present invention is explained with reference to FIG. 15. FIG. 15 is a diagram showing a configuration of the data transfer unit 60 which is the epitome of the switch of the parallel computer according to the second exemplary embodiment of the present invention. Note that, a configuration of a data transfer system which is an epitome of a parallel computer according to the second exemplary embodiment of the present invention is the same as the configuration of the data transfer system 5 which is the epitome of the parallel computer according to the first exemplary embodiment of the present invention. Therefore, its explanation is omitted.

The data transfer unit 60 includes input ports 651 to 654, output ports 655 to 658, an arbitration means 659, and a strength information notification means 660.

Each of the input ports 651 to 654 receives data which is sent from one of the plurality of processors 501 to 516 and the plurality of data transfer units 517 to 536.

Each of the output ports 655 to 658 outputs data which is sent to one of the plurality of processors 501 to 516 and the plurality of data transfer units 517 to 536.

The arbitration means 659 executes arbitration of two or more pieces of conflicting data which are sent to a same next destination. Furthermore, when receiving the conflicting data from a plurality of the data transfer units via a plurality of the input ports and executing the arbitration, the arbitration means 659 decides a selection ratio according to a ratio between the input ports in relation to magnitude of a value indicated by strength information received from each of the input ports. The selection ratio indicates a ratio of selecting each of the plurality of input ports and receiving the conflicting data from the selected input port.

When receiving two or more pieces of the strength information from a plurality of the data transfer units via a plurality of the input ports, the strength information notification means 660 generates the strength information indicating a total value of a value indicated by each of the two or more pieces of received strength information. The strength information notification means 660 sends the generated same strength information to each of a plurality of next destinations via a plurality of the output ports.

Next, a processing of the data transfer unit 60 according to the second exemplary embodiment of the present invention is explained.

Each of the plurality of the processors 501 to 516 outputs the strength information indicating the initial value to the destination data transfer unit. When receiving the two or more pieces of strength information from the plurality of data transfer units via each of the plurality of input ports, the strength information notification means 660 generates the strength information indicating the total value of the value indicated by each of the two or more pieces of received strength information. The strength information notification means 660 sends the generated same strength information to each of the plurality of next destinations via the plurality of output ports.

When receiving the conflicting data sent to the same next destination from the plurality of data transfer units via each of the input ports, the arbitration means 659 executes the arbitration of the received conflicting data. In the arbitration, the arbitration means 659 decides a selection ratio according to a ratio between the input ports in relation to magnitude of the value indicated by the strength information received from each of the input ports. The selection ratio indicates a ratio of selecting each of the plurality of input ports and receiving conflicting data from the selected input port. The arbitration means 659 executes the arbitration of the conflicting data according to the decided selection ratio.

Next, the parallel computer according to the second exemplary embodiment of the present invention is explained in detail. An arbitration circuit 601 according to the second exemplary embodiment of the present invention is explained with reference to FIG. 16. Note that, configurations of the parallel computer and the switch according to the second exemplary embodiment of the present invention are the same as the configurations of the parallel computer and the switch according to the first exemplary embodiment of the present invention. Therefore, its explanation is omitted. Furthermore, a processing of the arbitration circuit 601 according to the second exemplary embodiment of the present invention is the same as the processing shown in FIG. 7. Therefore, its explanation is omitted.

Figure 16:
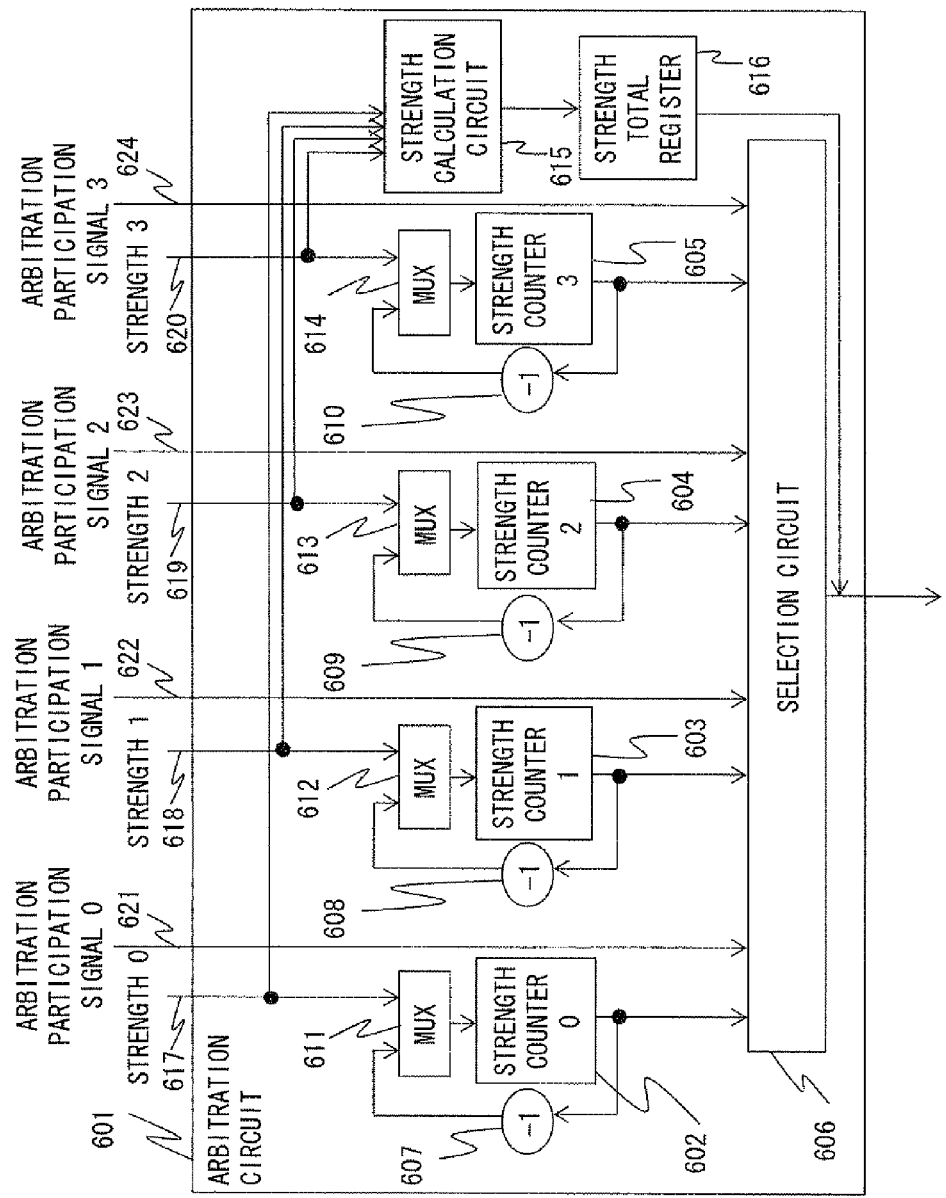
FIG. 16 is a diagram showing a configuration of an arbitration circuit of the parallel computer according to the second exemplary embodiment of the present invention.

FIG. 16 shows the arbitration circuit 601 in the switch included in the inter-processor network of the parallel computer according to the second exemplary embodiment of the present invention. There is a difference between the second exemplary embodiment and the first exemplary embodiment in the arbitration circuit 601. The arbitration circuit 601 of the second exemplary embodiment and the arbitration circuit 301 of the first exemplary embodiment are different in that arbitration participation signals 621 to 624 are not input to a strength calculation circuit 615 in the arbitration circuit 601.

The strength calculation circuit 615 of the arbitration circuit 601 of the second exemplary embodiment calculates a total value of the strengths without considering the state of the arbitration participation. Then, the strength calculation circuit 615 stores the calculated total value of the strength in a strength total register 616. The arbitration circuit 601 sets the total value of the strength stored in the strength total register 616 as the strength in the arbitration of the packet header in the packet sent to the switch of the next stage. For example, the arbitration circuit 601 may store the total value of strengths 617 to 620 in the strength total register 616 at the timing of the step S102. Furthermore, the arbitration circuit 601 may store the total value of the strength changed from 0 to a value other than 0 and the value stored in the strength total register 616 in the strength total register 616.

As explained above, first, the processors 101 to 116 set the initial value of 1 as the strength of the packet, and then output the packet. The arbitration circuit 601 includes the total value of the strengths in the packets input to the input ports within a predetermined period in the packet as the strength, and then the packet is output to each of the switches of the next stage. That is, this enables each of the switches to transmit the degree of that the packets converge on itself to the switch of the next stage as the strength.

Then, the arbitration circuit 601 selects the number of packets equivalent to the value indicated by the strength included in the packet which is input to each of the input ports from each of the input ports, and then outputs the selected packet to the next stage. This enables the arbitration circuit 601 to output more packets to the next stage from the input port to which the packet is input from the switch outputting more packets.

That is, the second exemplary embodiment of the present invention can reduce the variance of the transfer time of the packets transferred between processors. Furthermore, the second exemplary embodiment of the present invention does not require the signal lines to transmit the arbitration participation signals from the input FIFO memories 210 to 213 to the strength calculation circuit 615. Therefore, it is possible to prevent the circuit size from increasing.

Third Exemplary Embodiment

Figure 17:
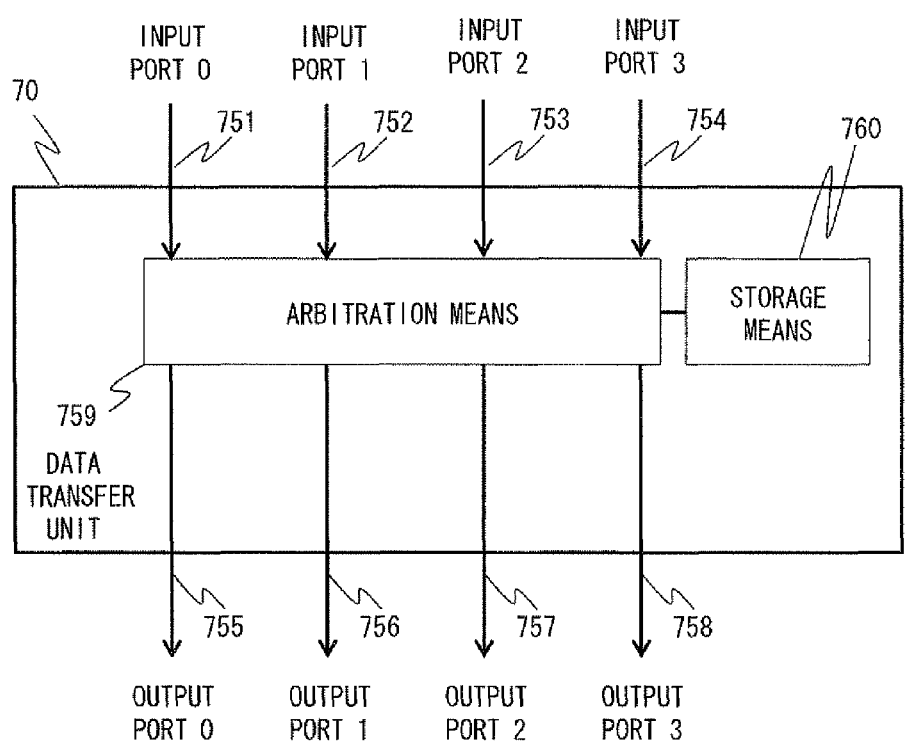
FIG. 17 is a diagram showing a configuration of a data transfer unit which is an epitome of a switch of a parallel computer according to a third exemplary embodiment of the present invention.

Next, a data transfer unit 70 which is an epitome of a switch of a parallel computer according to a third exemplary embodiment of the present invention is explained with reference to FIG. 17. FIG. 17 is a diagram showing a configuration of the data transfer unit 70 which is the epitome of the switch of the parallel computer according to the third exemplary embodiment of the present invention. Note that, a configuration of a data transfer system which is an epitome of a parallel computer according to the third exemplary embodiment of the present invention is the same as the configuration of the data transfer system 5 which is the epitome of the parallel computer according to the first exemplary embodiment of the present invention. Therefore, its explanation is omitted.

The data transfer unit 70 includes input ports 751 to 754, output ports 755 to 758, an arbitration means 759, and a storage means 760.

Each of the input ports 751 to 754 receives data which is sent from one of the plurality of processors 501 to 516 and the plurality of data transfer units 517 to 536.

Each of the output ports 755 to 758 outputs data which is sent to one of the plurality of processors 501 to 516 and the plurality of data transfer units 517 to 536.

The arbitration means 759 executes arbitration of two or more pieces of conflicting data sent to a same next destination. Furthermore, when receiving the conflicting data from a plurality of data transfer units via a plurality of the input ports and executing the arbitration, the arbitration means 759 decides a selection ratio according to a ratio between the input ports in relation to the number of transfer routes indicated by transfer route number information of each of the input ports. The selection ratio indicates a ratio of selecting each of the plurality of input ports and receiving the conflicting data from the selected input port.

The storage means 760 stores the transfer route number information indicating the number of transfer routes through which data is transferred to the input port from a plurality of the processors for each of the plurality of input ports that receive data from the plurality of data transfer units.

Next, a processing of the data transfer unit 70 according to the third exemplary embodiment of the present invention is explained.

When receiving the two or more pieces of conflicting data which are sent to a same next destination from the plurality of data transfer units via each of the input ports, the arbitration means 759 executes the arbitration of the received conflicting data. In the arbitration, the arbitration means 759 decides a selection ratio according to a ratio between the input ports in relation to magnitude of the number of transfer routes indicated by the transfer route number information of each of the input ports. The selection ratio indicates a ratio of selecting each of the plurality of input ports and receiving the conflicting data from the selected input port. The arbitration means 659 executes the arbitration of the conflicting data according to the decided selection ratio.

Next, the parallel computer according to the third exemplary embodiment of the present invention is explained in detail. A switch 701 according to the third exemplary embodiment of the present invention is explained with reference to FIG. 18. Note that, a configuration of the parallel computer according to the third exemplary embodiment of the present invention is the same as the configuration of the parallel computer according to the first exemplary embodiment of the present invention. Therefore, its explanation is omitted. A configuration of an arbitration circuit according to the third exemplary embodiment of the present invention is the same as the configuration of the arbitration circuit according to the first exemplary embodiment of the present invention except the strength calculation circuit 315 and the strength total register 316 are not included. Therefore, its explanation is omitted. Furthermore, a processing of the arbitration circuit according to the third exemplary embodiment of the present invention is the same as the processing shown in FIG. 7. Therefore, its explanation is omitted.

Figure 18:
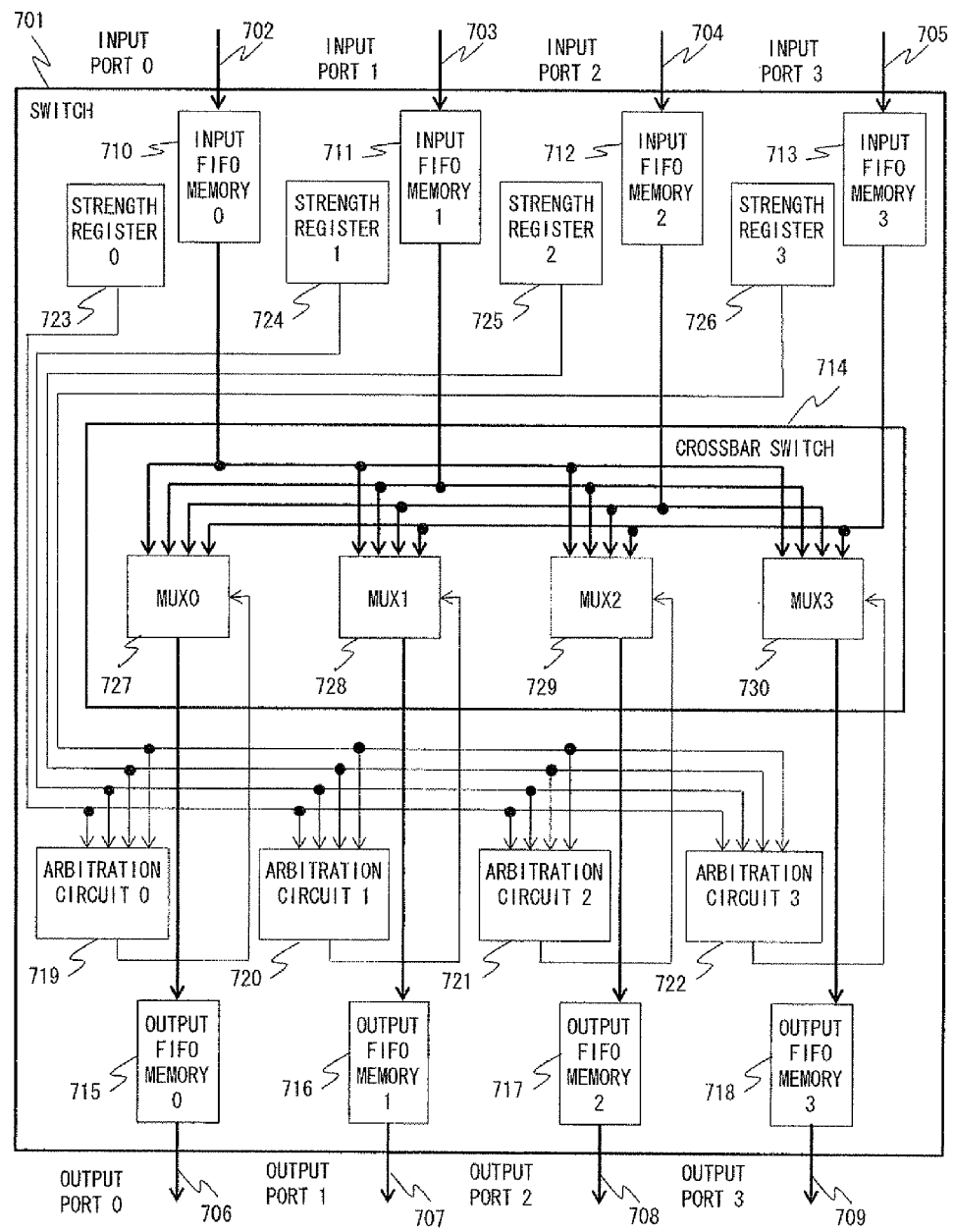
FIG. 18 is a diagram showing a configuration of the switch of the parallel computer according to the third exemplary embodiment of the present invention.
Figure 19:
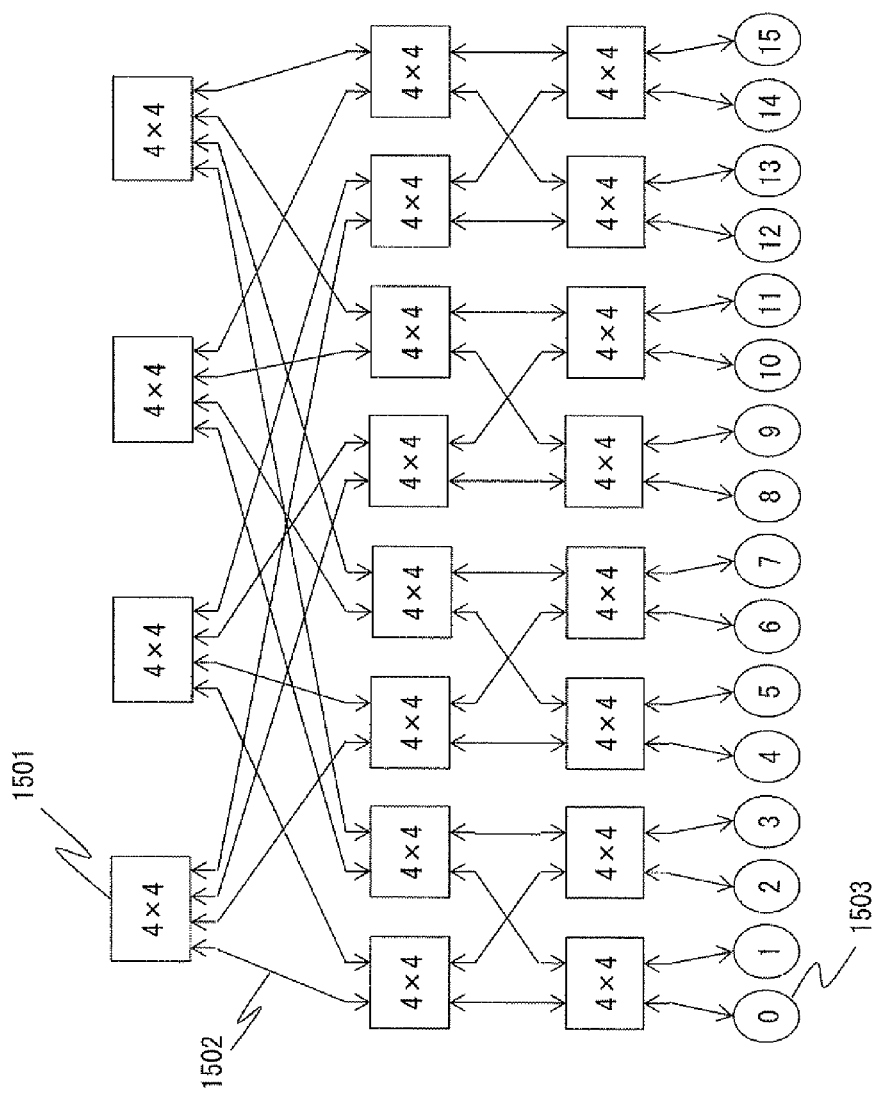
FIG. 19 is a diagram showing a configuration of a Fat Tree network.
Figure 20:
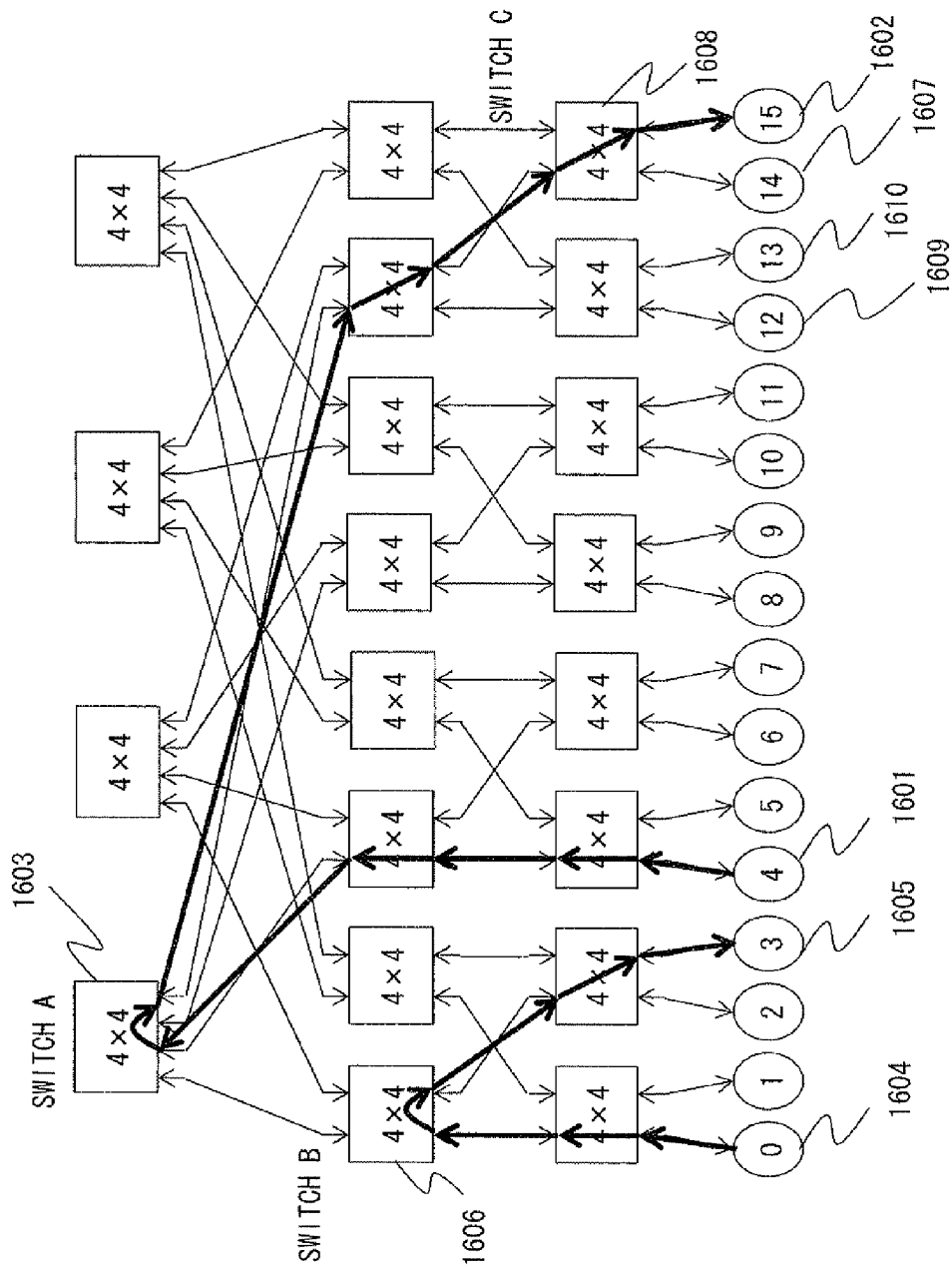
FIG. 20 is a diagram to explain a routing of the Fat Tree network.
Figure 21:
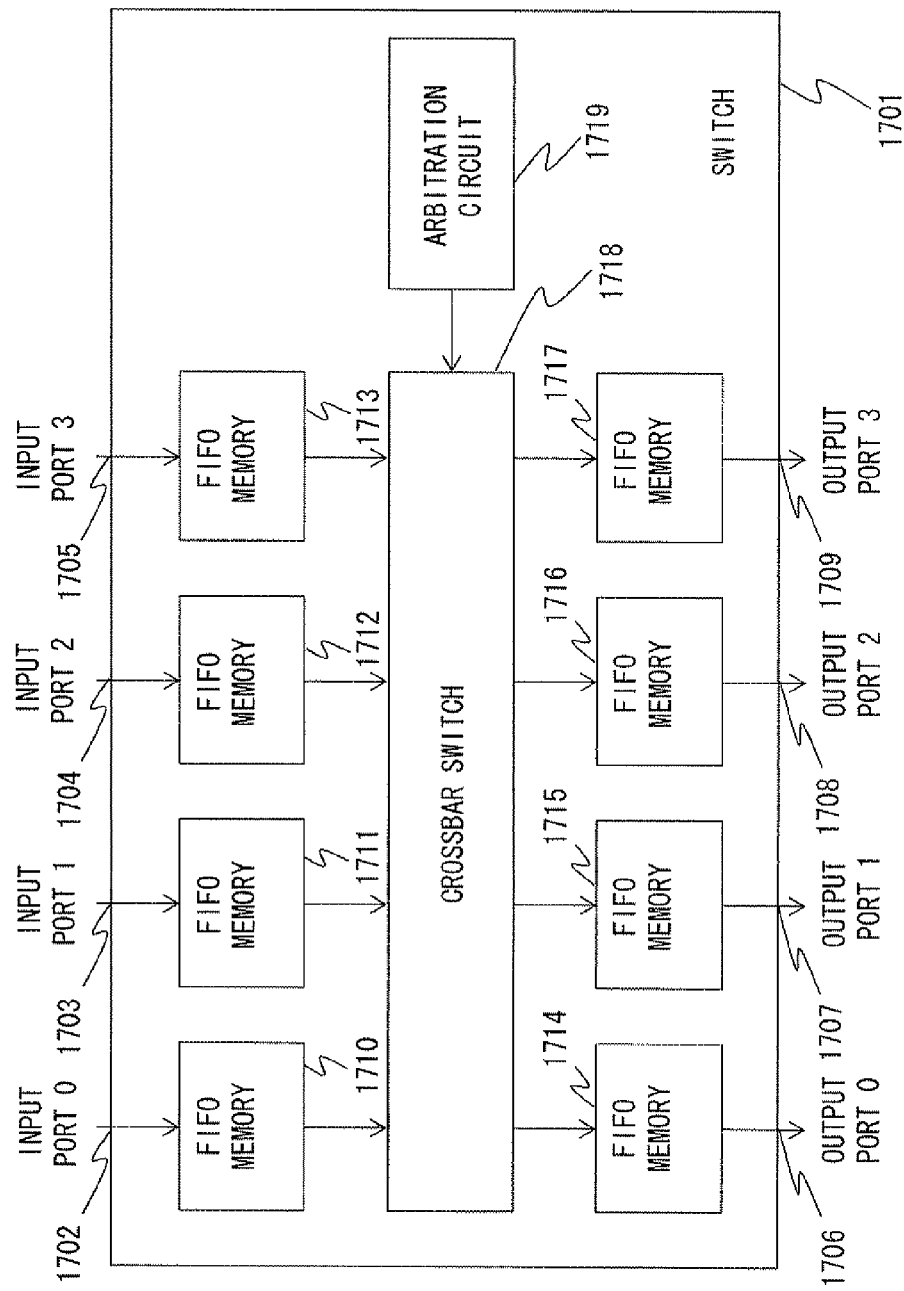
FIG. 21 is a diagram showing an example of a configuration of a switch.
Figure 22:
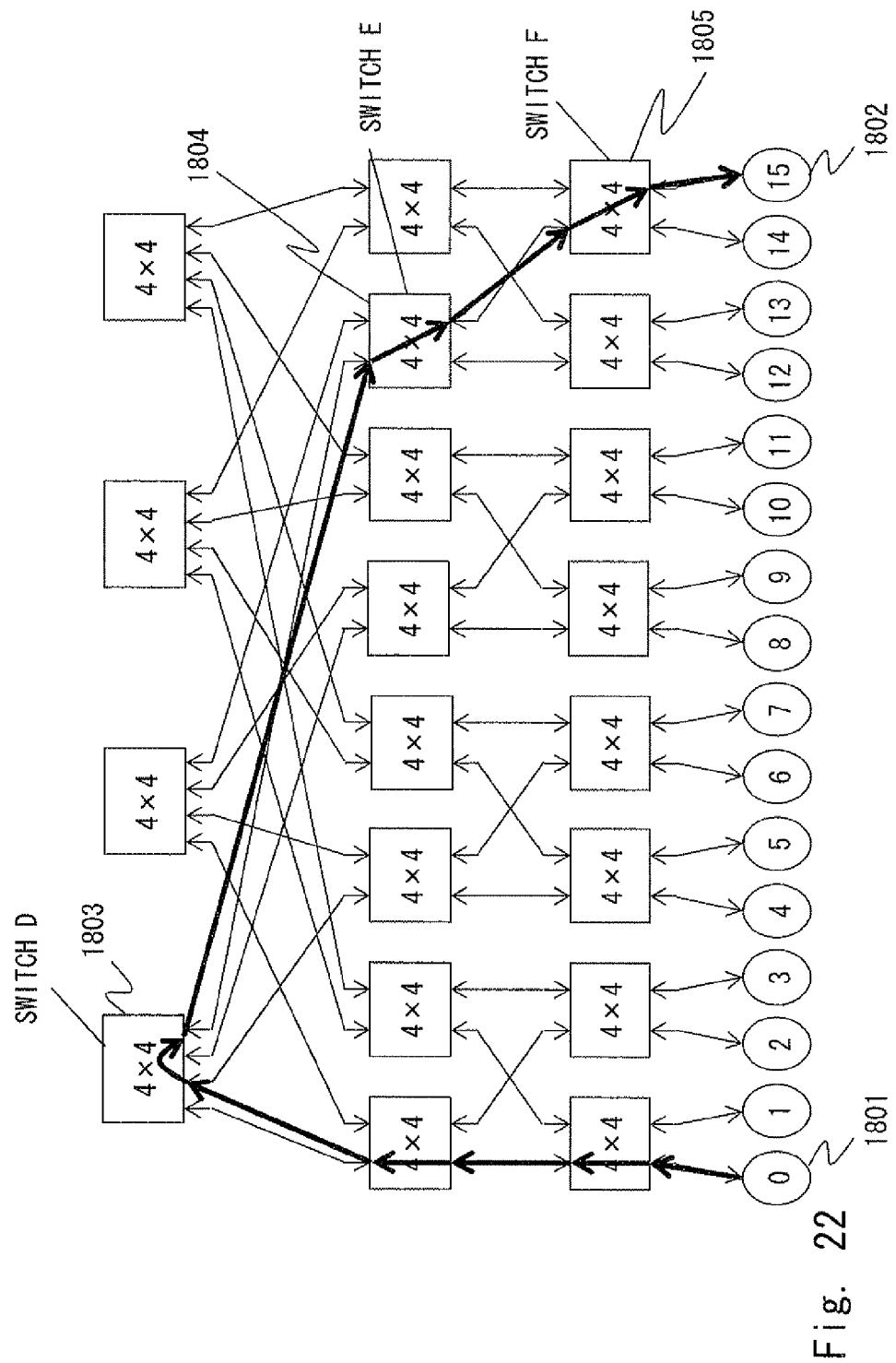
FIG. 22 is a diagram to explain a problem in the Fat Tree network.
Figure 23:
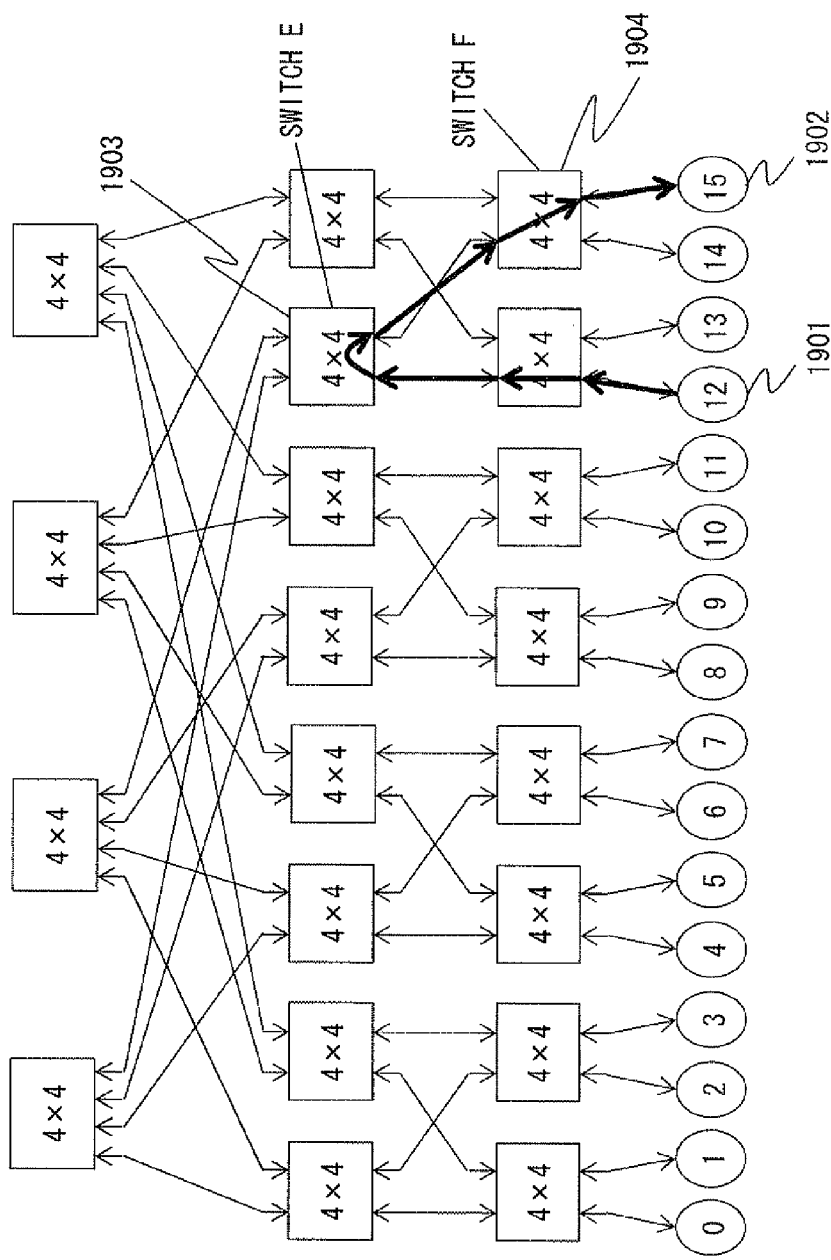
FIG. 23 is a diagram to explain the problem in the Fat Tree network.
Figure 24:
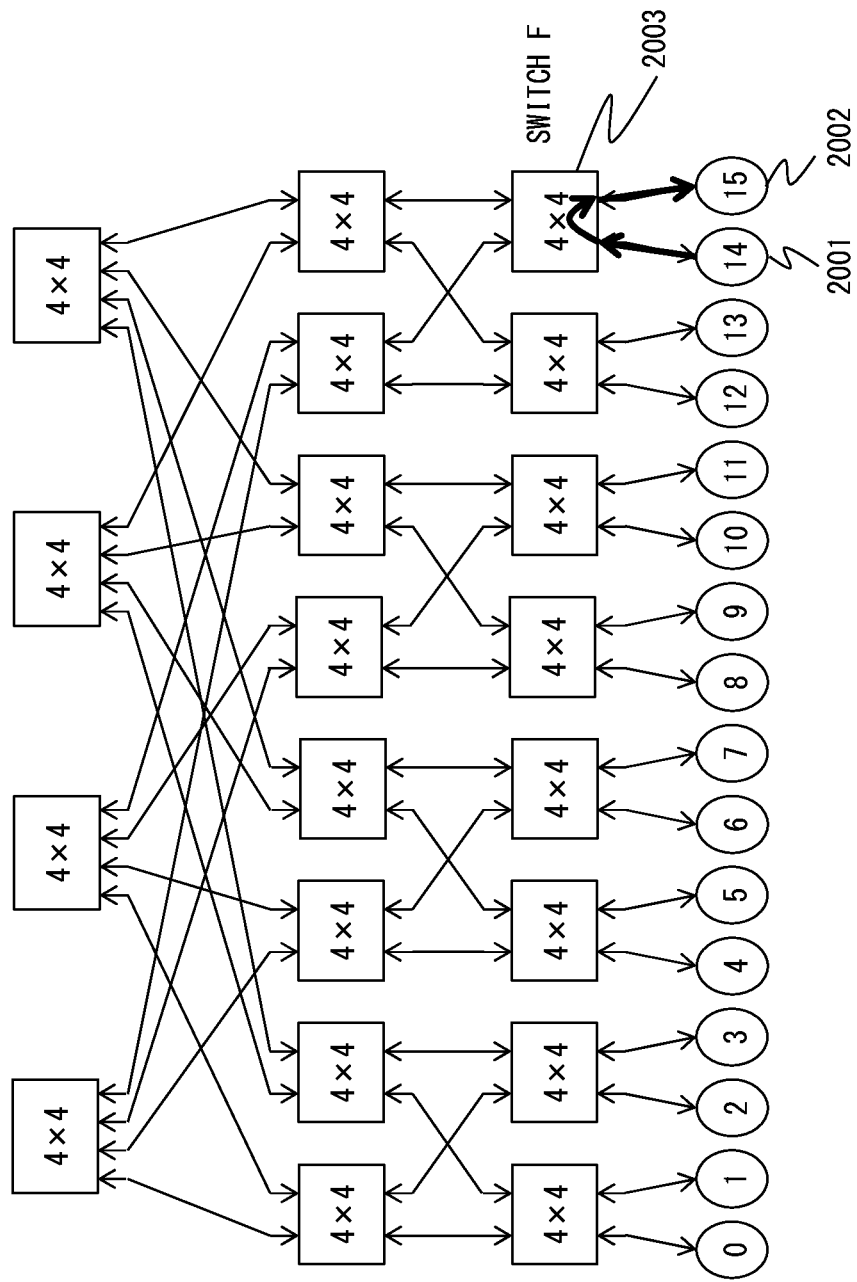
FIG. 24 is a diagram to explain the problem in the Fat Tree network.

FIG. 18 shows the switch 701 included in the inter-processor network of the parallel computer according to the third exemplary embodiment of the present invention. The third exemplary embodiment is different from the first exemplary embodiment in that instead of reading the strength in the arbitration to be set in strength registers 723 to 726 from the packet header and setting it, the strength in the arbitration is preliminarily set according to a connection configuration of the switches in the switch 701.

In particular, each of the strength registers 723 to 726 stores the number of transfer routes through which the packet is transferred to the input port corresponding to each of the strength registers 723 to 726 from the processors 101 to 116. Here, the switch 1204 exemplified in FIG. 12B is explained as an example. The packet is transferred to the input port 0 of the switch 1204 from the one processor 12 (1203). Therefore, the strength register 0 (723) corresponding to the input port 0 stores 1. The packet is transferred to the input port 1 of the switch 1204 from the one processor 14. Therefore, the strength register 1 (724) corresponding to the input port 1 stores 1. The packet is transferred to the input port 2 of the switch 1204 from the three processors 0, 4, and 8. Therefore, the strength register 2 (725) corresponding to the input port 2 stores 3. The packet is transferred to the input port 3 of the switch 1204 from the three processors 1, 5, and 9. Therefore, the strength register 3 (726) corresponding to the input port 3 stores 3.

As explained above, each of the strength registers 723 to 726 stores the number of transfer routes through which the packet input to the input port corresponding to each of the strength registers 723 to 726 is transferred from the processors 101 to 116 as the strength. Note that, when the number of transfer routes through which the packet is transferred to the input from the processors 101 to 116 is large, the number of packets which are input to the input port is large. That is, the strength stored in each of the strength registers 723 to 726 is a degree of that the packets converge on each of input ports 702 to 705.

Then, each of arbitration circuits 719 to 722 selects the number of packets equivalent to the number of transfer routes indicated by the strength which is output from the strength register corresponding to each of the input ports from each of the input ports, and then outputs the selected packet to the next stage. This enables the arbitration circuit 701 to output more packets to the next stage from the input port that receives the packet from the switch outputting more packets.

That is, the third exemplary embodiment of the present invention can reduce the variance of the transfer time of the packets transferred between processors. Furthermore, the third exemplary embodiment of the present invention does not require the strength calculation circuit, the strength total register, the processing setting the strength in the packet in the arbitration circuits 719 to 722, and the processing setting the strength in the strength register in the input FIFO memories 710 to 713. Therefore, it is possible to prevent the circuit size from increasing. Furthermore, in packet, the area storing the strength in the arbitration can be eliminated. Therefore, it is possible to reduce data amount of the data transferred in the inter-processor network.

An exemplary advantage according to the above-described embodiments is to provide the data transfer system, the switch, and the data transfer method that can reduce the variance of the transfer time of the packets transferred between processors.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The number of processors and the number of switches included in the inter-processor network are not limited to the number exemplified in these exemplary embodiments. Furthermore, the configuration of the inter-processor network is not limited to the configuration exemplified in these exemplary embodiments. That is, this present invention can be applied to an inter-processor network which is not the inter-processor network in which the switches are connected in multistage, as exemplified in these exemplary embodiments.

In the first and second exemplary embodiments of the present invention, when executing the arbitration, the arbitration circuit decides the value indicated by the strength received from each of the input ports as the number of selecting each of the plurality of the input ports and receiving the conflicting data from the selected input port. However, it is not limited to this. When executing the arbitration, the arbitration circuit may decide a selection ratio, which is a ratio of selecting each of the plurality of input ports and receiving the conflicting data from the selected input port, according to a ratio between the input ports in relation to magnitude of the strength received from each of the input ports. This also enables to output more packets to the next stage from the input port that receives the packet from the switch outputting more packets. Therefore, the variance of the transfer time of the packets transferred between processors can be reduced.

In the first and second exemplary embodiments of the present invention, the switch includes the strength in the arbitration in the packet and outputs the packet. However, it is not limited to this. For example, the switch may associate the strength information indicating the strength in the arbitration with the packet and outputs the strength information separately from the packet.

In the third exemplary embodiment of the present invention, when executing the arbitration, the arbitration circuit decides the number of transfer routes indicated by the transfer route number information for each of the input ports as the number of selecting each of the plurality of the input ports and receiving the conflicting data from the selected input port. However, it is not limited to this. When executing the arbitration, the arbitration circuit may decide a selection ratio, which is a ratio of selecting each of the plurality of input ports and receiving the conflicting data from the selected input port, according to a ratio between the input ports in relation to the number of magnitude of the transfer routes indicated by the transfer route number information for each of the input ports. This also enables to output more packets to the next stage from the input port that receives the packet from the switch outputting more packets. Therefore, the variance of the transfer time of the packets transferred between processors can be reduced.

The whole or part of the exemplary embodiments disclosed above can be described as, but not limited to, the following supplementary notes.

(Supplementary Note 1)

A data transfer system comprising:

a plurality of processors; and a plurality of data transfer units that executes a data transfer from one processor to another processor included in the plurality of processors via a plurality of input ports and a plurality of output ports, wherein the data transfer unit comprises:
an arbitration unit that executes arbitration of two or more pieces of conflicting data which are sent to a same next destination; and
a strength information notification unit that sends strength information indicating a number of conflicts of the two or more pieces of arbitrated conflicting data to the next destination, and
wherein the arbitration unit decides, when receiving the conflicting data from a plurality of the data transfer units via a plurality of the input ports and executing the arbitration, a selection ratio which indicates a ratio of selecting each of the plurality of input ports and receiving the conflicting data from the selected input port, according to a ratio between the input ports in relation to magnitude of the number of conflicts indicated by the strength information received from each of the input ports.

(Supplementary Note 2)

The data transfer system according to Supplementary note 1,
wherein the strength information notification unit associates the strength information indicating the number of conflicts of the two or more pieces of arbitrated conflicting data with each of the two or more pieces of arbitrated conflicting data, and sends the strength information to the same next destination,
wherein the arbitration unit comprises a plurality of arbitration circuits each of which corresponds to each of the plurality of the output ports and executes the arbitration of the conflicting data sent to the next destination via the corresponding output port, and
wherein the arbitration circuit decides the selection ratio based on the strength information associated with the conflicting data sent via the output port corresponding the arbitration circuit among two or more pieces of the strength information received from each of the input ports.

(Supplementary Note 3)

The data transfer system according to Supplementary note 2,
wherein the strength information notification unit comprises a plurality of strength information notification circuits each of which corresponds to each of the plurality of the output ports, associates the strength information with the conflicting data sent via the corresponding output port and sends the strength information to the next destination via the corresponding output port, and
wherein the strength information notification circuit calculates the number of conflicts of the conflicting data based on the strength information associated with the conflicting data sent via the output port corresponding to the strength information notification circuit.

(Supplementary Note 4)

The data transfer system according to Supplementary note 2 or 3, wherein
the arbitration circuit comprises a plurality of counters each of which corresponds to each of the plurality of input ports and counts the number of that the corresponding input port is selected and the conflicting data is input from the selected input port, and selects each of the plurality of input ports and receives the conflicting data from the selected input port until the number of counts of each of the plurality of counters agrees with the number of conflicts indicated by the strength information received from the input port corresponding to each of the plurality of counters.

(Supplementary Note 5)

The data transfer system according to one of Supplementary notes 1 to 4, wherein the arbitration unit preferentially sends the conflicting data from the input port receiving the strength information indicating a larger number of conflicts to the next destination.

(Supplementary Note 6)

The data transfer system according to one of Supplementary notes 1 to 5,
wherein the conflicting data is a packet including destination processor information indicating the processor to which the data is transferred, and
wherein the data transfer unit is a switch routing the packet based on the destination processor information included in the packet.

(Supplementary Note 7)

The data transfer system according to one of Supplementary notes 2 to 4, wherein the strength information notification unit includes the strength information indicating the number of conflicts of the arbitrated conflicting data in the arbitrated conflicting data to transmit the data.

(Supplementary Note 8)

The data transfer system according to one of Supplementary notes 1 to 7, further comprising an inter-processor network in which the plurality of the data transfer units are connected in multistage.

What is claimed is:

1. A data transfer system comprising:
a plurality of processors; and
a plurality of data transfer units that executes a data transfer from one processor to another processor included in the plurality of processors via a plurality of input ports and a plurality of output ports,
wherein each of the data transfer units comprises:
an arbitration unit that executes arbitration of two or more pieces of data which are each sent to a same next destination, the data being conflicting when the data is sent to a same output port; and
a strength information notification unit that includes strength information indicating a number of conflicts of the two or more pieces of arbitrated conflicting data in the arbitrated conflicting data, and sends the arbitrated conflicting data to the next destination,
wherein the arbitration unit decides, when receiving the conflicting data from a plurality of the data transfer units via a plurality of the input ports and executing the arbitration, a ratio of the number of conflicts indicated by the strength information included in the conflicting data received via a first input port to the number of conflicts indicated by the strength information included in the conflicting data received via a second input port, as a selection ratio which indicates a ratio of selecting the first input port to selecting the second input port and receiving the conflicting data from the second input port, and
the strength information notification unit calculates a total value obtained by adding together the number of conflicts, indicated by the strength information included in each of the two or more pieces of the arbitrated conflicting data, as the number of conflicts of strength information included in the arbitrated conflicting data sent to the next destination.

2. The data transfer system according to claim 1,
wherein the strength information notification unit associates the strength information indicating the number of conflicts of the two or more pieces of arbitrated conflicting data with each of the two or more pieces of arbitrated conflicting data, and sends the strength information to the same next destination,
wherein the arbitration unit comprises a plurality of arbitration circuits each of which corresponds to each of the plurality of the output ports and executes the arbitration of the conflicting data sent to the next destination via the corresponding output port, and
wherein the arbitration circuit decides the selection ratio based on the strength information associated with the conflicting data sent via the output port corresponding the arbitration circuit among two or more pieces of the strength information received from each of the input ports.

3. The data transfer system according to claim 2,
wherein the strength information notification unit comprises a plurality of strength information notification circuits each of which corresponds to each of the plurality of the output ports, associates the strength information with the conflicting data sent via the corresponding output port and sends the strength information to the next destination via the corresponding output port, and
wherein the strength information notification circuit calculates the number of conflicts of the conflicting data based on the strength information associated with the conflicting data sent via the output port corresponding to the strength information notification circuit.

4. The data transfer system according to claim 2, wherein the arbitration circuit comprises a plurality of counters each of which corresponds to each of the plurality of input ports and counts the number of times of inputting the conflicting data from the corresponding input port, and selects each of the plurality of input ports and receives the conflicting data from the selected input port until the number of counts of each of the plurality of counters agrees with the number of conflicts indicated by the strength information received from the input port corresponding to each of the plurality of counters.

5. The data transfer system according to claim 1, wherein the arbitration unit sends the conflicting data from the input port receiving the strength information indicating a larger number of conflicts to the next destination.

6. The data transfer system according to claim 1,
wherein the conflicting data is a packet including destination processor information indicating the processor to which the data is transferred, and
wherein the data transfer unit is a switch routing the packet based on the destination processor information included in the packet.

7. A data transfer system comprising:
a plurality of processors; and
a plurality of data transfer units that executes a data transfer from one processor to another processor included in the plurality of processors via a plurality of input ports and a plurality of output ports,
wherein the processor sends strength information indicating an initial value to a next destination,
wherein the data transfer unit comprises:
an arbitration unit that executes arbitration of two or more pieces of data which are each sent to a same next destination, the data being conflicting when the data is sent to a same output port; and
a strength information notification unit that, when receiving two or more pieces of the conflicting data from a plurality of the data transfer units via a plurality of the input ports, generates strength information indicating a total value obtained by adding together the values indicated by the strength information included in each of the two or more pieces of the conflicting data, includes the generated strength information in the conflicting data, and sends the conflicting data to each of a plurality of next destinations via a plurality of the output ports, and
wherein the arbitration unit decides, when receiving the conflicting data from a plurality of the data transfer units via a plurality of the input ports and executing the arbitration, a ratio of the value indicated by the strength information included in the conflicting data received via a first input port to the value indicated by the strength information included in the conflicting data received via a second input port, as a selection ratio which indicates a ratio of selecting the first input port and receiving the conflicting data from the first input port to selecting the second input port and receiving the conflicting data from the second input port.

8. A data transfer system comprising:
a plurality of processors; and
a plurality of data transfer units that executes a data transfer from one processor to another processor included in the plurality of processors via a plurality of input ports and a plurality of output ports,
wherein the data transfer unit comprises:
a storage unit that stores transfer route number information indicating a number of processors from which data is transferred to the input port among the plurality of the processors for each of the plurality of input ports that receive data from the plurality of data transfer units; and
an arbitration unit that executes arbitration of two or more pieces of data which are each sent to a same next destination, the data being conflicting when the data is sent to a same output port, and
wherein the arbitration unit decides, when receiving the conflicting data from a plurality of the data transfer units via a plurality of the input ports and executing the arbitration, a ratio of the number of processors indicated by the transfer route number information for a first input port to the number of processors indicated by the transfer route number information for a second input port, as a selection ratio which indicates a ratio of selecting the first input port and receiving the conflicting data from the first input port to selecting the second input port and receiving the conflicting data from the second input port.

* * * * *